United States Patent
Kageyama et al.

(10) Patent No.: US 8,319,892 B2
(45) Date of Patent: Nov. 27, 2012

(54) VIDEO SIGNAL PROCESSING APPARATUS, VIDEO DISPLAYING APPARATUS AND HIGH RESOLUTION METHOD FOR VIDEO SIGNAL

(75) Inventors: Masahiro Kageyama, Hino (JP); Koichi Hamada, Yokohama (JP); Shigeki Nagaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1238 days.

(21) Appl. No.: 11/896,477

(22) Filed: Aug. 31, 2007

(65) Prior Publication Data
US 2008/0074537 A1   Mar. 27, 2008

(30) Foreign Application Priority Data
Sep. 26, 2006   (JP) .................... 2006-259886

(51) Int. Cl.
H04N 7/01 (2006.01)
H04N 9/74 (2006.01)
G09G 5/00 (2006.01)
G06K 9/32 (2006.01)

(52) U.S. Cl. ........ 348/448; 348/458; 348/581; 348/584; 345/660; 382/298; 382/299; 382/300

(58) Field of Classification Search ................ None
See application file for complete search history.

(56) References Cited

U.S. PATENT DOCUMENTS

| | | | | |
|---|---|---|---|---|
| 5,642,168 A * | 6/1997 | Masaki | ................ | 348/441 |
| 6,023,535 A | 2/2000 | Aoki | | |
| 6,587,602 B2 * | 7/2003 | Wakisawa et al. | ............ | 382/298 |
| 6,801,250 B1 * | 10/2004 | Miyashita | ................ | 348/220.1 |
| 7,375,767 B2 * | 5/2008 | Lee et al. | ................ | 348/581 |
| 2005/0128307 A1 * | 6/2005 | Kobayashi et al. | ........ | 348/208.1 |
| 2005/0190296 A1 * | 9/2005 | Kondo et al. | ................ | 348/565 |
| 2005/0237544 A1 * | 10/2005 | Suzuki et al. | ................ | 358/1.2 |
| 2006/0159369 A1 * | 7/2006 | Young | ................ | 382/299 |

FOREIGN PATENT DOCUMENTS
EP   1 492 051 A2   12/2004

OTHER PUBLICATIONS

Extended European Search Report issued in European Patent Application No. EP 07253469.6-2218/1906664, dated Aug. 12, 2009.
Aoki, Shin, "Super Resolution Processing by Plural Number of Lower Resolution image", RICOH Technical Report pp. 19-25, No. 24, Nov. 1998.
Ando, Shigeru "A Velocity Vector Field Measurement System Based on Spatio-Temporal Image Derivative", Papers of Measurement Automatic Control Academic Society, pp. 1300-1336, vol. 22, No. 12, 1986.
Kobayashi et al., "Calculation Method of a Phase-Only Correlation Function for Images Based on Discrete Transform", IEICE Technical Report ITS2005-299(Feb. 2006) pp. 73-78.

* cited by examiner

*Primary Examiner* — Chris Parry
*Assistant Examiner* — Oschta Montoya
(74) *Attorney, Agent, or Firm* — McDermott Will & Emery LLP

(57) ABSTRACT

For providing a technology for preferably achieving high resolution of video signals of a video signal or moving video, with a small number of frames thereof, a video signal processing apparatus comprise an input unit to be inputted a plural number of video frames, a resolution converter unit, having resolution converting characteristics differing from each other, depending on a direction thereof, by composing 2 pieces of the video frames from the inputted video frames, thereby increasing a number of pixels making up the video frames, and a mixer unit for obtaining the output video frame by mixing output results of the resolution converter unit.

13 Claims, 32 Drawing Sheets

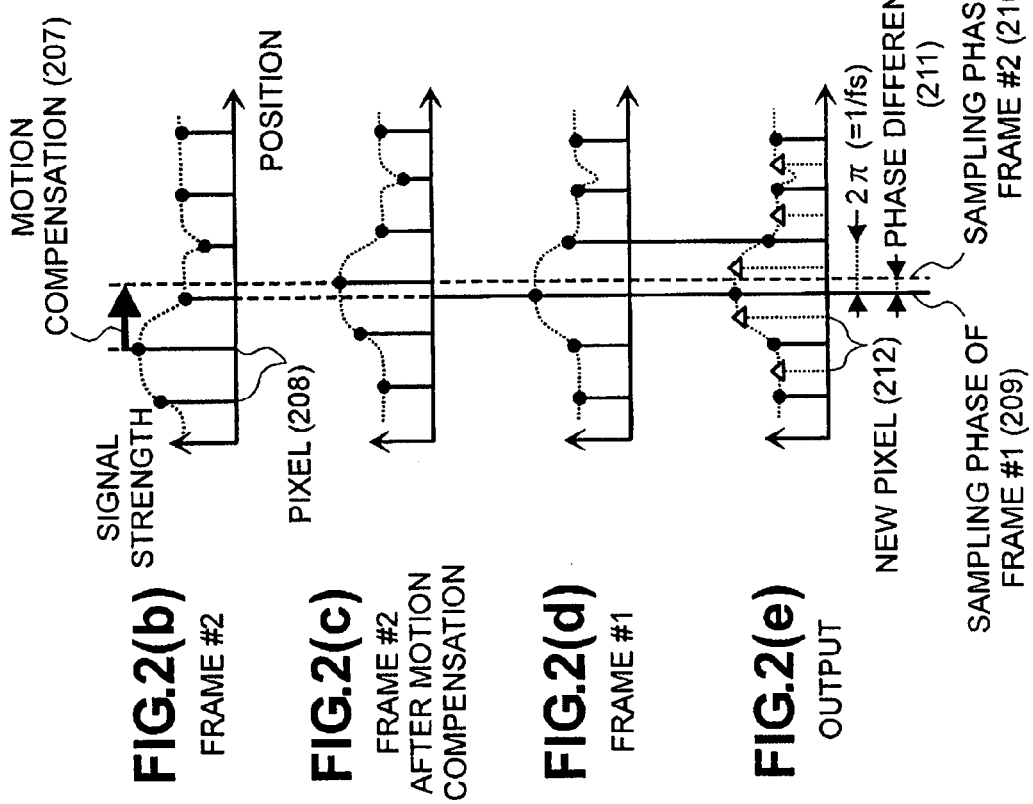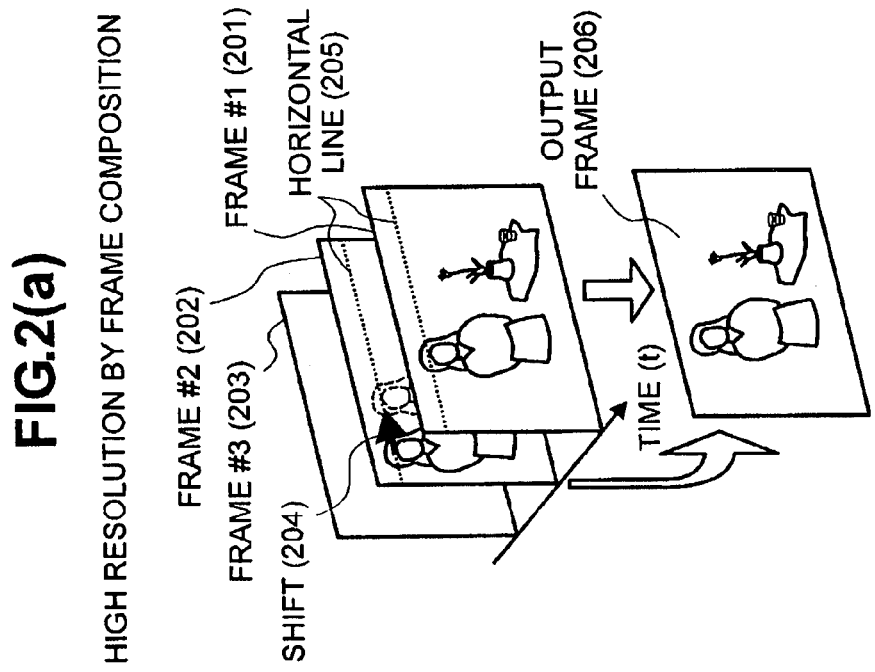

PHASE RELATIONSHIP OF EACH COMPONENT

PHASE RELATIONSHIP OF ORIGINAL COMPONENTS

PHASE RELATIONSHIP OF ALIASING COMPONENTS

PHASE RELATIONSHIP OF EACH COMPONENT

PHASE RELATIONSHIP OF ORIGINAL COMPONENTS

PHASE RELATIONSHIP OF ALIASING COMPONENTS

"FREQUENCY-GAIN" CHARACTERISTIC

"FREQUENCY-GAIN" CHARACTERISTIC

"FREQUENCY-PHASE DIFFERENCE" CHARACTERISTIC

TAP COEFFICIENT C

FIG.9(a)

(1) SUM OF ORIGINAL COMPONENTS ON Re AXIS=1
(2) SUM OF ORIGINAL COMPONENTS ON Im AXIS=0
(3) SUM OF ALIASING COMPONENTS ON Re AXIS=0
(4) SUM OF ALIASING COMPONENTS ON Im AXIS=0

FIG.9(b)

(1) $C_0 + C_2 = 1$
(2) $C_1 + C_3 = 0$
(3) $C_0 + C_2 \cdot \cos\theta - C_3 \cdot \sin\theta = 0$
(4) $C_1 + C_2 \cdot \sin\theta + C_3 \cdot \cos\theta = 0$

FIG.9(c)

$C_0 = 1/2$
$C_1 = -(1 + \cos\theta)/2\sin\theta$
$C_2 = 1/2$
$C_3 = (1 + \cos\theta)/2\sin\theta$

FIG.9(d)

| θ | C0 | C1 | C2 | C3 |
|---|---|---|---|---|
| 0 | 0.5 | — | 0.5 | — |
| π/8 | 0.5 | -2.51 | 0.5 | 2.51 |
| 2π/8 | 0.5 | -1.21 | 0.5 | 1.21 |
| 3π/8 | 0.5 | -0.75 | 0.5 | 0.75 |
| 4π/8 | 0.5 | -0.5 | 0.5 | 0.5 |
| 5π/8 | 0.5 | -0.33 | 0.5 | 0.33 |
| 6π/8 | 0.5 | -0.21 | 0.5 | 0.21 |
| 7π/8 | 0.5 | -0.1 | 0.5 | 0.1 |
| 8π/8 | 0.5 | 0 | 0.5 | 0 |
| 9π/8 | 0.5 | 0.1 | 0.5 | -0.1 |
| 10π/8 | 0.5 | 0.21 | 0.5 | -0.21 |
| 11π/8 | 0.5 | 0.33 | 0.5 | -0.33 |
| 12π/8 | 0.5 | 0.5 | 0.5 | -0.5 |
| 13π/8 | 0.5 | 0.75 | 0.5 | -0.75 |
| 14π/8 | 0.5 | 1.21 | 0.5 | -1.21 |
| 15π/8 | 0.5 | 2.51 | 0.5 | -2.51 |

FIG.13

| θ | C0 | C1 | C4 |
|---|---|---|---|
| 0 | 0 | 0 | 1.0 |
| $\pi/8$ | 0 | 0 | 1.0 |
| $2\pi/8$ | 0.5 | -1.21 | 0 |
| $3\pi/8$ | 0.5 | -0.75 | 0 |
| $4\pi/8$ | 0.5 | -0.5 | 0 |
| $5\pi/8$ | 0.5 | -0.33 | 0 |
| $6\pi/8$ | 0.5 | -0.21 | 0 |
| $7\pi/8$ | 0.5 | -0.1 | 0 |
| $8\pi/8$ | 0.5 | 0 | 0 |
| $9\pi/8$ | 0.5 | 0.1 | 0 |
| $10\pi/8$ | 0.5 | 0.21 | 0 |
| $11\pi/8$ | 0.5 | 0.33 | 0 |
| $12\pi/8$ | 0.5 | 0.5 | 0 |
| $13\pi/8$ | 0.5 | 0.75 | 0 |
| $14\pi/8$ | 0.5 | 1.21 | 0 |
| $15\pi/8$ | 0 | 0 | 1.0 |

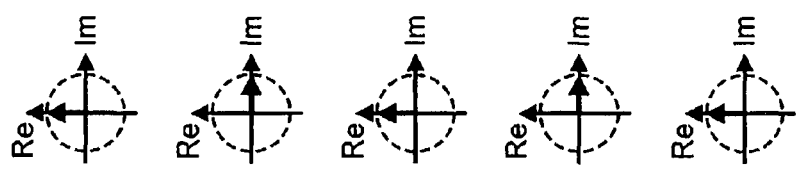
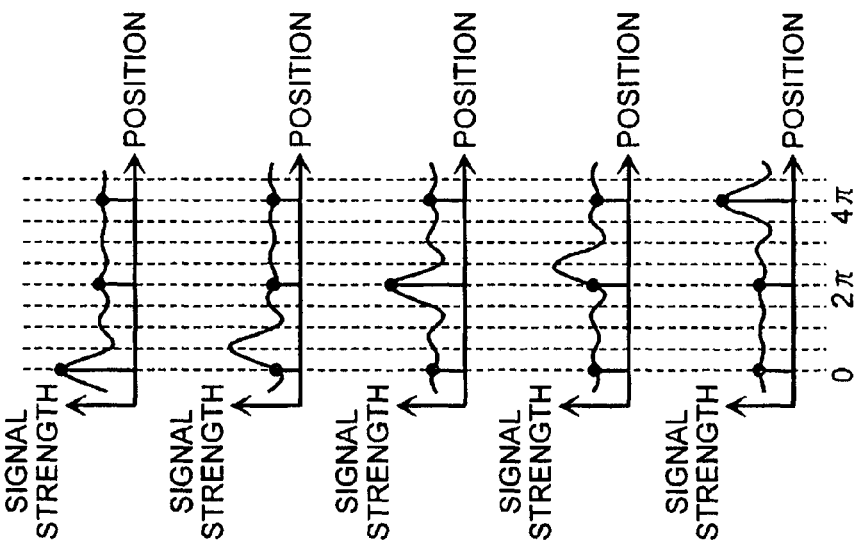
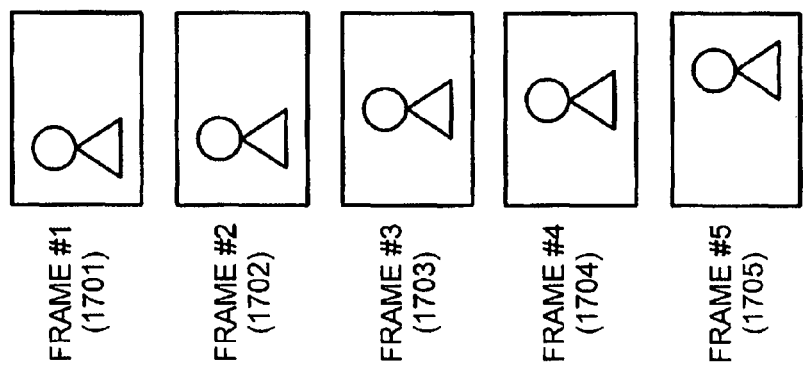

FIG.19(a)

OUTPUT = $C_{r0} \cdot S_{r0} + C_{i0} \cdot S_{i0} + C_{r1} \cdot S_{r1} + C_{i1} \cdot S_{i1} + C_{r2} \cdot S_{r2} + C_{i2} \cdot S_{i2} + \cdots + C_{r(n-1)} \cdot S_{r(n-1)} + C_{i(n-1)} \cdot S_{i(n-1)}$

FIG.19(b)

$$\begin{pmatrix} 1 \\ 0 \\ 0 \\ 0 \\ 0 \\ 0 \\ \vdots \\ 0 \\ 0 \end{pmatrix} = \begin{pmatrix} 1 & 0 & 1 & 0 & 1 & 0 & \cdots & 1 & 0 \\ 0 & 1 & 0 & 1 & 0 & 1 & \cdots & 0 & 1 \\ 1 & 0 & \cos\theta_1 & -\sin\theta_1 & \cos\theta_2 & -\sin\theta_2 & \cdots & \cos\theta_{(n-1)} & -\sin\theta_{(n-1)} \\ 0 & 1 & \sin\theta_1 & \cos\theta_1 & \sin\theta_2 & \cos\theta_2 & \cdots & \sin\theta_{(n-1)} & \cos\theta_{(n-1)} \\ 1 & 0 & \cos 2\theta_1 & -\sin 2\theta_1 & \cos 2\theta_2 & -\sin 2\theta_2 & \cdots & \cos 2\theta_{(n-1)} & -\sin 2\theta_{(n-1)} \\ 0 & 1 & \sin 2\theta_1 & \cos 2\theta_1 & \sin 2\theta_2 & \cos 2\theta_2 & \cdots & \sin 2\theta_{(n-1)} & \cos 2\theta_{(n-1)} \\ \vdots & \vdots & \vdots & \vdots & \vdots & \vdots & & \vdots & \vdots \\ 1 & 0 & \cos(n-1)\theta_1 & -\sin(n-1)\theta_1 & \cos(n-1)\theta_2 & -\sin(n-1)\theta_2 & \cdots & \cos(n-1)\theta_{(n-1)} & -\sin(n-1)\theta_{(n-1)} \\ 0 & 1 & \sin(n-1)\theta_1 & \cos(n-1)\theta_1 & \sin(n-1)\theta_2 & \cos(n-1)\theta_2 & \cdots & \sin(n-1)\theta_{(n-1)} & \cos(n-1)\theta_{(n-1)} \end{pmatrix} \begin{pmatrix} C_{r0} \\ C_{i0} \\ C_{r1} \\ C_{i1} \\ C_{r2} \\ C_{i2} \\ \vdots \\ C_{r(n-1)} \\ C_{i(n-1)} \end{pmatrix}$$

| COEFFICIENT C4 (HORIZONTAL) | COEFFICIENT C4 (VERTICAL) | COEFFICIENT K (HORIZONTAL) | COEFFICIENT K (VERTICAL) |
|---|---|---|---|
| 0 | 0 | 0.5 | 0.5 |
| 0 | 0.5 | 0.25 | 0.75 |
| 0 | 1.0 | 0 | 1.0 |
| 0.5 | 0 | 0.75 | 0.25 |
| 0.5 | 0.5 | 0.5 | 0.5 |
| 0.5 | 1.0 | 0.75 | 0.25 |
| 1.0 | 0 | 1.0 | 0 |
| 1.0 | 0.5 | 0.75 | 0.25 |
| 1.0 | 1.0 | 0.5 | 0.5 |

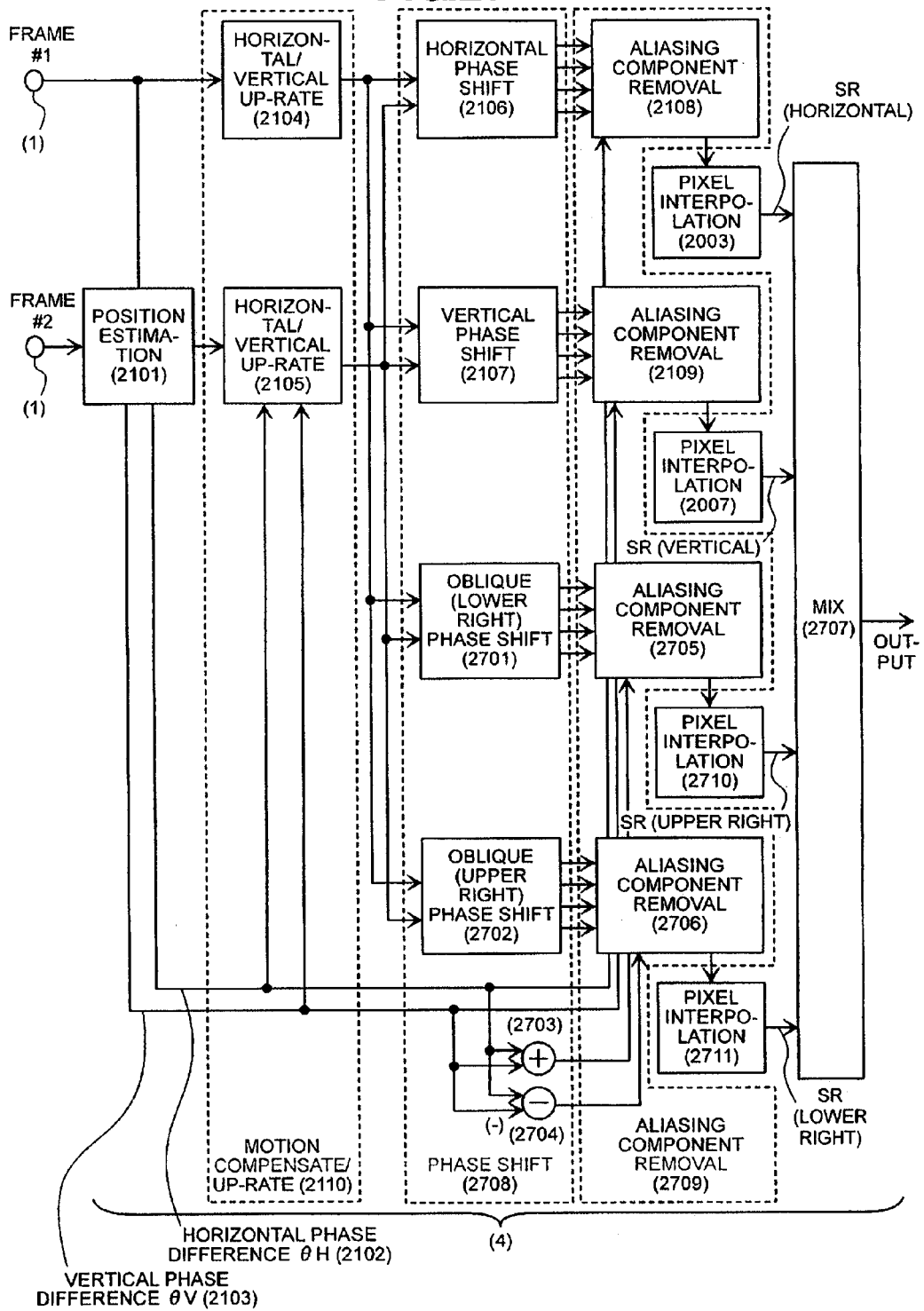

HORIZONTAL PHASE SHIFT

VERTICAL PHASE SHIFT

OBLIQUE (LOWER RIGHT) PHASE SHIFT

OBLIQUE (UPPER RIGHT) PHASE SHIFT

FIG.34(a)
INPUT VIDEO
FIG.34(b)
OUTPUT VIDEO
FRAME #1 (3401)
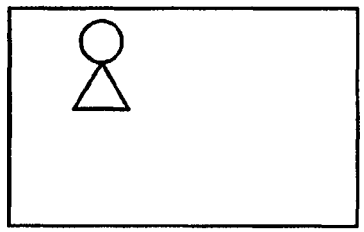
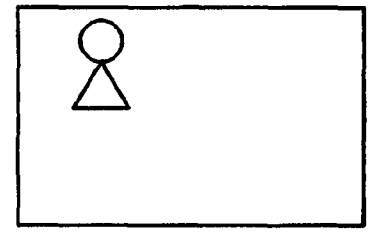
FRAME #2 (3402)
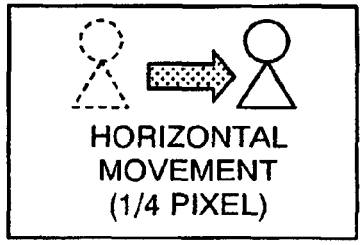
HORIZONTAL MOVEMENT (1/4 PIXEL)
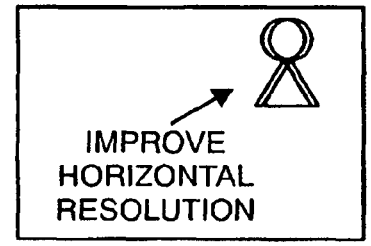
IMPROVE HORIZONTAL RESOLUTION
FRAME #3 (3403)
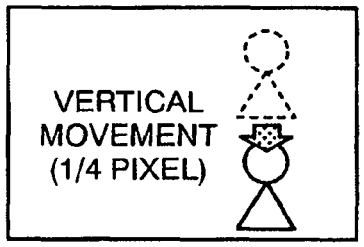
VERTICAL MOVEMENT (1/4 PIXEL)
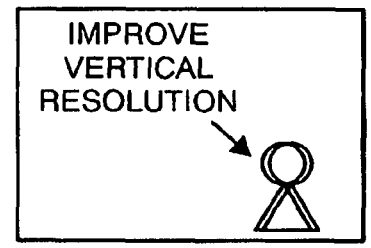
IMPROVE VERTICAL RESOLUTION
FRAME #4 (3404)
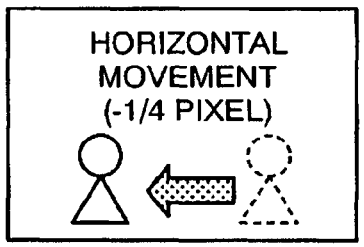
HORIZONTAL MOVEMENT (-1/4 PIXEL)
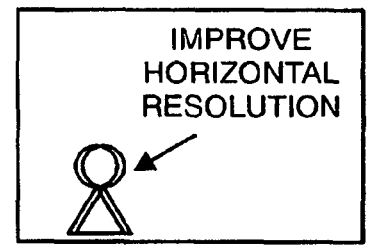
IMPROVE HORIZONTAL RESOLUTION
FRAME #5 (3405)
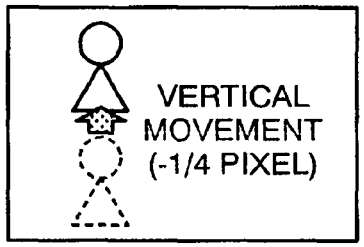
VERTICAL MOVEMENT (-1/4 PIXEL)
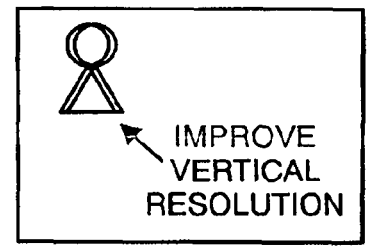
IMPROVE VERTICAL RESOLUTION

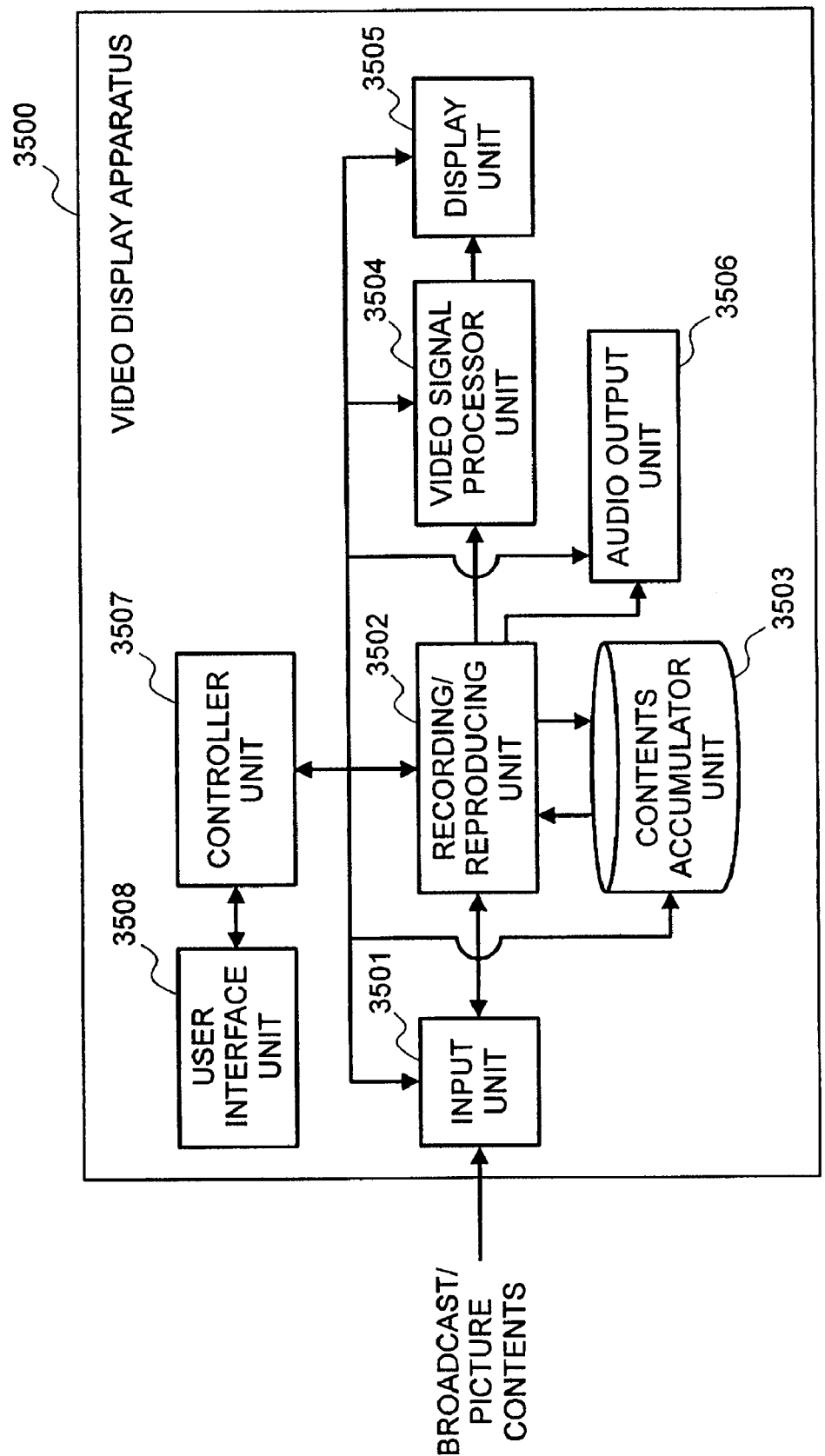

VIDEO SIGNAL PROCESSING APPARATUS, VIDEO DISPLAYING APPARATUS AND HIGH RESOLUTION METHOD FOR VIDEO SIGNAL

BACKGROUND OF THE INVENTION (1) Field of the Invention

The present invention relates to a technology for obtaining a high-resolution video signal from a video signal, and in particular, it relates to a technology for achieving the high resolution, with increasing a number of pixels building up a video frame and removing unnecessary aliasing, while composing or combing a plural number of video frames.

(2) Description of the Related Art

In recent years, advancement is made on large sizing of the screen, for television receivers, and accompanying with this, it is common that the video signal inputted from broadcasting, communication and/or storage medium, etc., is not displayed on it as it is, but is displayed with increasing the pixel numbers in the horizontal/vertical directions through digital signal processing. In this instance, however, it is impossible to increase the resolution only by increasing the pixel number, through an interpolation low-pass filter using sinc function or spline function, being well-know in general.

Then, as is already described in a reference document 1, there is proposed a technology (hereinafter, the conventional art) for increasing the pixel number while achieving the high resolution at the same time, by composing or synthesizing a plural number of picture or video frames (hereinafter, being called only "frame", in brief). With this conventional art, the high resolution can be obtained through three processes, (1) motion estimation, (2) broadband interpolation, and (3) a weighted sum. Herein, the (1) motion estimation is a process for assuming or estimating difference in the sampling phase (or sampling position) for each video data, with using the each video data of the plural number of video frames inputted. The (2) broadband interpolation is a process for increasing the pixel number (i.e., sampling points) of the each video data, including the aliasing components therein, through interpolation, with use of a wideband low-pass filter for transmitting all of the high-frequency components of an original signal, thereby obtaining high resolution of the video data. The (3) weighted sum is a process for negating the aliasing components generated when sampling the pixels, by taking the weighted sum depending on the sampling phase of each high-density data, so as to remove them, and at the same time restoring the high-frequency components of the original signal.

FIGS. 2 (a) to 2(e) shows this high-resolution technology, in brief. As is shown in FIG. 2(a), herein it is assumed that a frame #1 (201), a frame #2 (202) and a frame #3 (203) on different time axes are inputted, to be composed with, thereby obtaining an output frame (206). For the purpose of simplification, first of all, consideration is paid upon case where the target moves into the horizontal direction (204), i.e., achieving the high resolution through a linear signal processing on a horizontal line (205). In this instance, as is shown in FIGS. 2(b) and 2(d), between the frame #2 (202) and the frame #1 (201) is generated a positional difference depending on an amount of moving (204) of the target. This positional difference is obtained through the (1) motion estimation mentioned above, thereby to make such motion compensation (207) upon the frame #2 (202) that no positional difference is generated, as is shown in FIG. 2(c), and at the same time, phase difference θ is obtained between the sampling phases (209) and (210) of pixels (208) for each frame. Through conducting the (2) broadband interpolation and the (3) weighted sum mentioned above, upon this phase difference θ (211), a new pixel (212) can be produced at a position just between the original pixels (208) (i.e., phase difference θ=π); thereby achieving the high resolution. Herein, as a technology of achieving such the (1) motion estimation mentioned above, a large number of methods are already proposed, as described in reference documents 2 and 3, for example, and it can be applied as it is. The (2) broadband interpolation can be achieved by means of a general low-pass filter, having pass band doubled to Nyquist frequency, as is described in the reference document 1. The (3) weighted sum will be mentioned later. However, in actual, it must be also considered that the movement of the target includes, not only the parallel movement, but also accompanying movements of rotation, expansion and reduction, etc.; however, in case where the time distance between the frames is very small and/or when the target moves slowly, it is possible to consider those movements with approximating them into a local parallel movement.

(Reference Document 1) Shin AOKI "Super Resolution Processing by Plural Number of Lower Resolution image", Ricoh Technical Report pp. 19-25, No. 24, NOVEMBER, 1998;

(Reference Document 2) Shigeru ANDO "A Velocity Vector Field Measurement System Based on Spatio-Temporal Image Derivative", Papers of Measurement Automatic Control Academic Society, pp. 1300-1336, Vol. 22, No. 12, 1986; and (Reference Document 3) Hiroyuki KOBAYASHI et al. "Calculation Method of a Phase-Only Correction Function for Images Based on Discrete Cosine Transform", IEICE Technical Report ITS2005-299(2006-02), pp. 73-78.

SUMMARY OF THE INVENTION

In case when achieving the high resolution of 2-times in the one-dimensional direction with the conventional technologies mentioned above, as is shown in FIGS. 3(a) to 3(c), it is necessary to use signals of at least three (3) pieces of frame pictures or videos when conducting the weighted sum of the above (3). Herein, FIGS. 3(a) to 3(c) are views for showing frequency spectrums of each component, within the one-dimensional frequency region. In those figures, distance from the frequency axis shows signal strength, while rotation angle around the frequency axis shows the phase thereof. With the weighted sum of the above (3), detailed explanation thereof will be given below.

As was mentioned above, when conducting an interpolation upon pixels through a wideband low-pass filter for transmitting the frequency band (frequency band from 0 to sampling frequency fs) being 2-times of the Nyquist frequency, by the wideband interpolation of the above (2), sum can be obtained of the component same to the original signal (hereinafter, being called "original component") and the aliasing component depending on the sampling phase. In this instance, when conducting the wideband interpolation of the above (2) upon the signals of three (3) pieces of frame videos, as is shown in FIG. 3(a), it is well-known that all phases of the original components (301), (302) and (303) of each frame are coincident with one another, and that the phases of aliasing components (304), (305) and (306) rotate depending on the sampling phase of the each frame. For easy understanding of phase relationship between the respective ones, the phase relationship of the original components of the each frame is shown in FIG. 3(b), and the relationship of the aliasing components of the each frame in FIG. 3(c).

Herein, by conducting the weighted sum of the above (3) upon three (3) pieces of the signals of frame pictures or videos, while appropriately selecting the coefficients to be multiplied thereon, it is possible to remove the aliasing components of each frame, negating one another, and thereby to extract only the original component. In this instance, for the purpose of making the vectrial sum of aliasing components (304), (305) and (306) of the each frame zero (0), i.e., bringing both components on Re axis (i.e., a real axis) and Im axis (i.e., an imaginary axis) into zero (0), at least three (3) pieces of the aliasing components are necessary. Accordingly, for realizing the 2-times high resolution, i.e., for removing one (1) piece of the aliasing component, it is necessary to use the signals of at least three (3) pieces of frame video.

In the similar manner, as is described in the Reference Document 1, for achieving the high resolution higher than n-times (n: an integer equal to or greater than two (2)), i.e., for removing the (n−1) pieces of aliasing components, it is necessary to use the signals of at least (2 n−1) pieces frame videos.

Accordingly, with the conventional technology, frame memory and the signal processing circuit becomes large in the scales thereof, and therefore not economic. Also, the necessity for conducting the motion estimation, correctly, upon a large number of frame videos separated on timing, brings the structures to be complex. Thus, with the conventional technology, it is difficult to obtain the high resolution of the moving pictures, such as, on the television broadcast signal, for example.

The present invention provides a technology for preferably achieving the high-resolution of the video signals. In more details, the present invention provided the technology for preferably achieving the high resolution of the video signals, with using a less number of pieces of frames.

According to the present invention, an output video frame is obtained with increasing the number of pixels building up the video frame into n-times, by composing the video frame of n pieces of video frames (n: an integer equal to or greater than two (2)). In more details, according to the present invention, estimation is made on sampling phase difference with using the video data on the input video frame to be a reference and the corresponding one of the respective video data on the other input video frames, and motion compensation is made on the video data of each of the input video frames with using information of that sampling phase difference, wherein the pixel number is increased to n-times. And, after shifting the video data of the each frame, the pixel number of which is increased, by a predetermined amount of phase, a coefficient, which is determined upon basis of the sampling phase difference mentioned above, is multiplied upon the respective video data in front and back of that phase shifting, thereby removing the (n−1) pieces of aliasing components.

Also, it is possible to provide an auxiliary pixel interpolation means for increasing the video data of the input video frame through the interpolation, thereby outputting a result of that auxiliary pixel interpolation means, in the place of a result of removing the aliasing components mentioned above, when the above-mentioned coefficient cannot be determined, in the structures thereof.

Thus, according to the present invention, it is possible to achieve the high resolution of the video signals, in more preferable manner.

BRIEF DESCRIPTION OF THE DRAWINGS

Those and other features, objects and advantages of the present invention will become more apparent from the following description when taken in conjunction with the accompanying drawings wherein:

FIGS. 2(a) to 2(e) are views for explaining operations of a general video signal processing for high resolution;

FIGS. 9(a) and 9(d) are views for explaining the first embodiment, according to the present invention;

FIG. 13 is a view for explaining the third embodiment, according to the present invention;

FIGS. 17(a) to 17(c) are views for explaining difference in the operations, between the present invention and the prior art;

FIG. 19 is a view for explaining the seventh embodiment, according to the present invention;

FIG. 27 is a view for explaining the tenth embodiment, according to the present invention;

FIGS. 34(a) and 34(b) are views for explaining difference in the operations between one embodiment of the present invention and the conventional technology;

FIG. 35 is a view for explaining a twelfth embodiment, according to the present invention.

DETAILED DESCRIPTION OF THE PREFERRED EMBODIMENTS

With a video signal processing apparatus according to embodiments of the present invention, a method for high resolution of video signals, and also a program for executing the same, aliasing components are removed from, shifting the phase of video data inputted by a predetermined amount (for example, π/2), when conducting the high resolution on the video signal. Hereinafter, embodiments according to the present invention will be fully explained by referring to the attached drawings.

Embodiment 1

Figure 1:
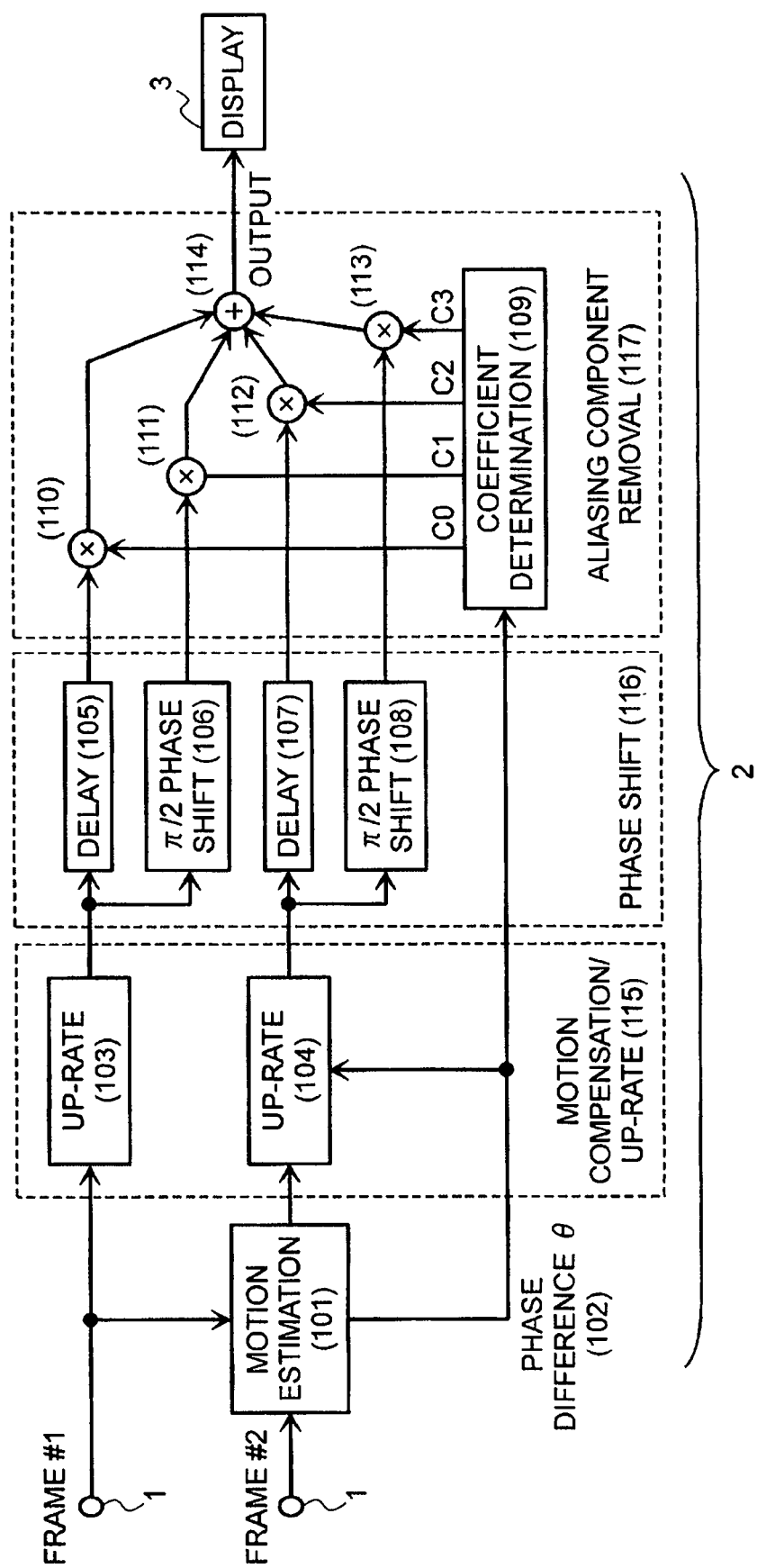
FIG. 1 is a block diagram for showing the configuration of a video signal processing apparatus, according to an embodiment of the present invention.
Figure 3A:
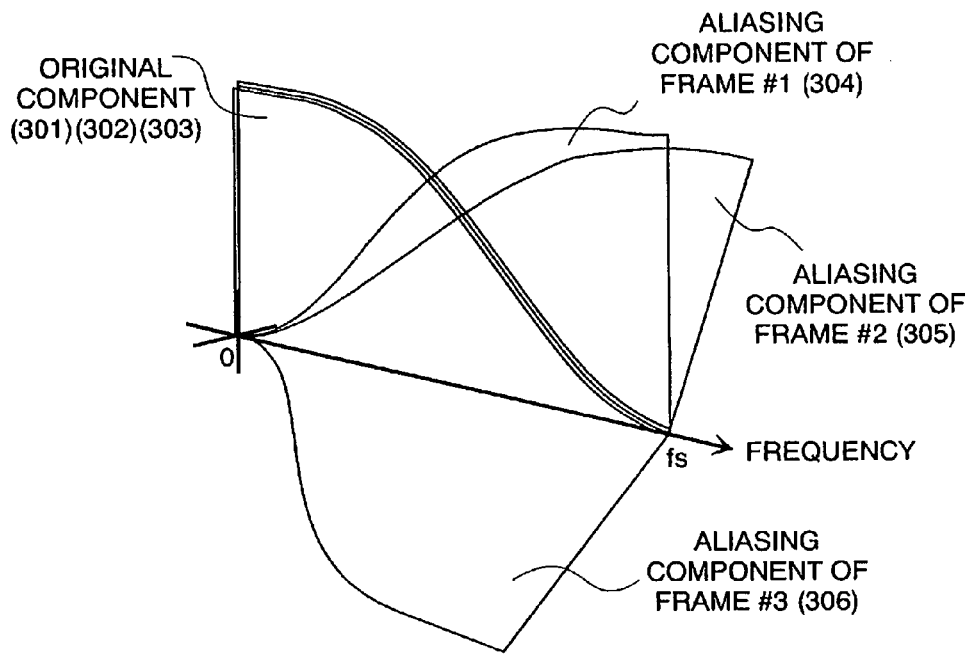
FIGS. 3(a) to 3(c) are views for explaining the operations in the prior art.
Figure 3B:
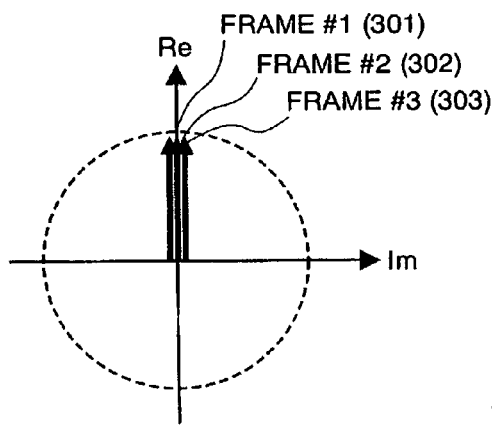
Figure 3C:
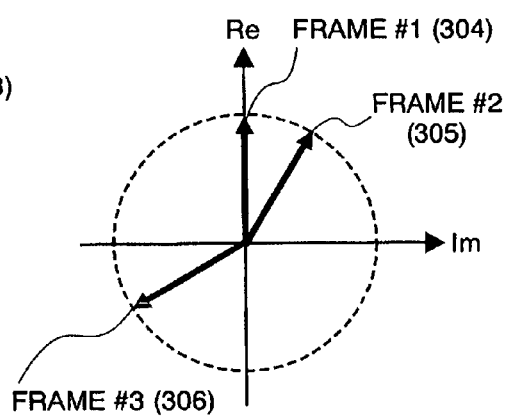

FIG. 1 shows a first embodiment of the video signal processing apparatus, according to the present invention, and the distinctive features thereof will be mentioned. The video signal processing apparatus, according to the present embodiment, will be applied into a video display apparatus, such as, a television receiver, etc., for example. In the present embodiment mentioned below, explanation will be made on the example of the video display apparatus, as the video signal processing apparatus. In FIG. 1, the video signal processing apparatus, according to the present embodiment, comprises an input portion 1, into which are inputted a frame line of moving pictures, such as, a television broadcast signal or the like, for example, a resolution converter portion 2 for obtaining high resolution of frames, which are inputted from that input portion, and further a display portion for displaying a picture upon basis of the frames, which are high resolved within that resolution converter portion 2. As this display portion 3 is applied a plasma display panel, a liquid crystal panel or an electron/electrolysis discharge type display panel. Hereinafter, detailed explanation will be made on the resolution converter portion 2.

In FIG. 1, first of all, by means of a motion estimation portion (101), upon basis of a sampling phase (sampling position) of pixel of a processing target on a frame #1 inputted into the input portion 1, estimation is made on a position of pixel corresponding on a frame #2, and thereby obtaining the sampling phase difference θ (102) thereof for each pixel. Next, by means of up-raters (103) and (104) of a motion compensation/up-rate portion (115), motion compensation is made upon the frame #2 with using information of the phase difference θ (102), so as to fit to the frame #1 in the position, as well as, increase the pixel numbers of the frames #1 and #2 up to two (2) times higher, respectively; thereby obtaining high density. In a phase-shift portion (116), the phase of this data high-densified is shifted by only a predetermined amount. Herein, as a means for shifting the phase of data by the predetermined amount, it is possible to use π/2 phase shifters (106) and (108). Also, for the purpose of compensation of delay, which is caused within those π/2 phase shifters (106) and (108), signals of the frames #1 and #2, which are high-densified, are delayed by means of retarders (105) and (107). In an aliasing component removal portion (117), each of output signals of the retarders (105) and (107) and Hilbert Transformers (106) and (108) is multiplied by an coefficient C0, C2, C1 or C3, which is produced upon basis of the phase difference θ (102) in a coefficient determining portion (109), respectively, within a multiplier (110), (112), (111) or (113), and then those signals are added within an adder (114); thereby obtaining an output. This output is supplied to the display portion 3. Further, the motion estimation portion (101) can be achieved with using the prior art mentioned above, as it is. Details of the up-raters (103) and (104), the π/2 phase shifters (106) and (108), and the aliasing component removal portion (117) will be mentioned later.

Figure 4A:
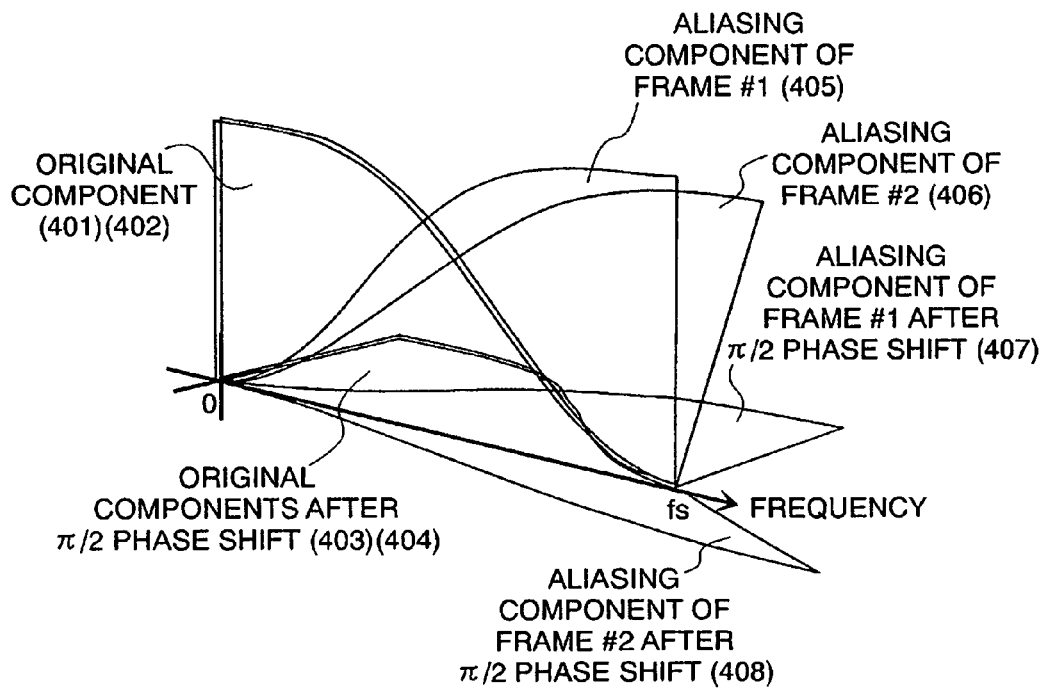
FIGS. 4(a) to 4(c) are views for explaining the operations in the first embodiment, according to the present invention.
Figure 4B:
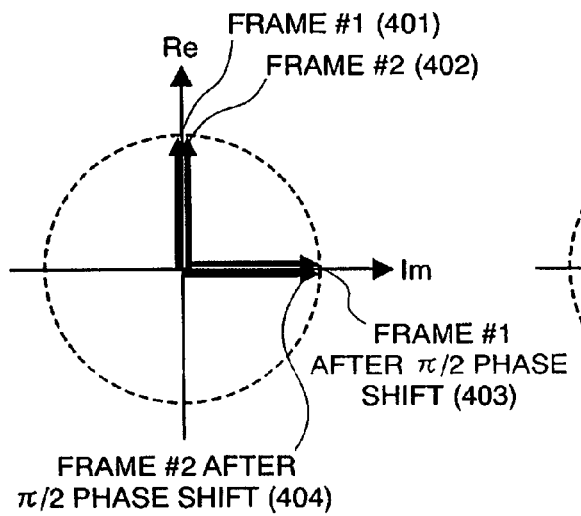
Figure 4C:
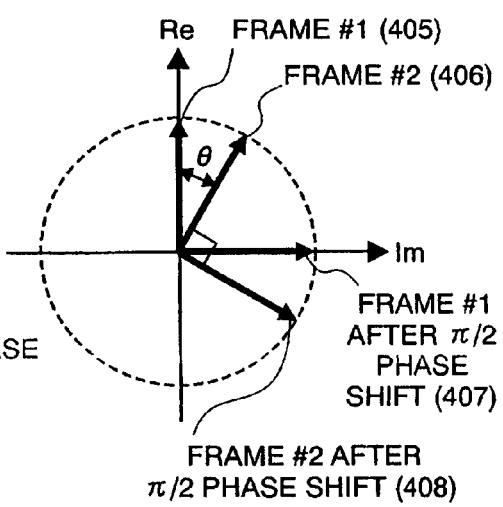

FIGS. 4(a) to 4(c) shows operations of the first embodiment of the present invention. Those figures show the respective outputs of the retarders (105) and (107) and the π/2 phase shifters (106) and (108), which are shown in FIG. 1, within one-dimensional frequency region thereof. In FIG. 4(a), each of the signals of frames #1 and #2 comes to be that obtained by adding an original component (401) or (402) and aliasing component (405) or (406), each of which is aliased from the original sampling frequency (fs). In this instance, the aliasing component (406) is rotated by the phase difference θ (102) mentioned above. On the other hand, each of the signals of frames #1 and #2, after the up-rating, which are outputted from the π/2 phase shifters (106) and (108), comes to be that obtained by adding the original component (403) or (404) after the π/2 phase shifting and the aliasing component (407) or (408), after the π/2 phase shifting. FIGS. 4(b) and 4(c) show the original components and the aliasing components, respectively, extracting them, for the purpose of easy understanding of phase relationships for each of the components shown in FIG. 4(a). Herein, if taking a weighed sum while determining the coefficients to be multiplied with each of the components, so that the component on Re axis be 1 and the component on Im axis be 0, when taking a vectorial sum of the four (4) components shown in FIG. 4(b), and also both components on the Re axis and the Im axis be 0 when taking a vectorial sum of the four (4) components shown in FIG. 4(c), then it is possible to extract only the original component with canceling the aliasing component therefrom. Thus, a video signal processing apparatus can be obtained for achieving the high resolution 2 times in the one-dimensional direction, with using only two (2) pieces of frame pictures. Details of the method for determining the coefficients will be mentioned later.

Figure 5:
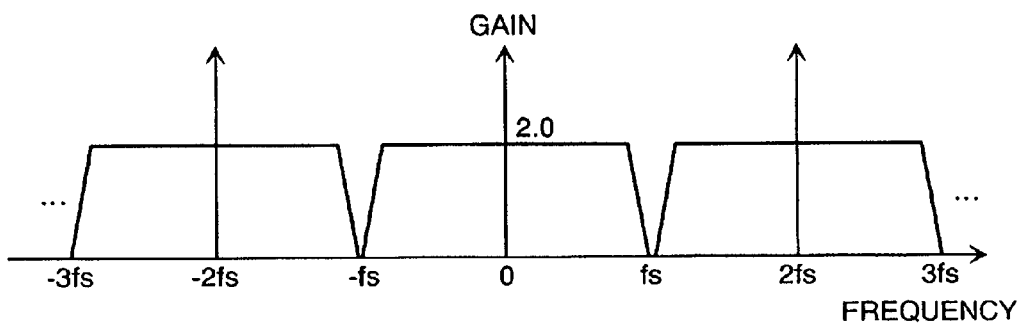
FIG. 5 is a view for explaining the first embodiment, according to the present invention.

FIG. 5 shows the operations of the up-raters (103) and (104) to be applied within the first embodiment, according to the present invention. In this FIG. 5, the horizontal axis shows the frequency and the vertical axis the gain (i.e., a value of ratio on an amplitude of the output signal to that of the input signal), i.e., the "frequency-gain" characteristics of the up-raters (103) and (104). Herein, within the up-raters (103) and (104), the high densification can be achieved by inserting a sampling point (=zero point) for a new pixel, at just middle position of the distance between the original pixels, while applying the frequency being two (2) times high (2 fs) with respect to the sampling frequency (fs) of the original signal as a new sampling frequency, and also applying such a filter having bandwidth for passing through all the frequencies from −fs to +fs at gain 2.0. In this instance, as is shown in the FIG. 5, a characteristic can be obtained, repeating at every frequency of n×2 fs (n: an integer), due to the symmetry of the digital signal.

Figure 6:
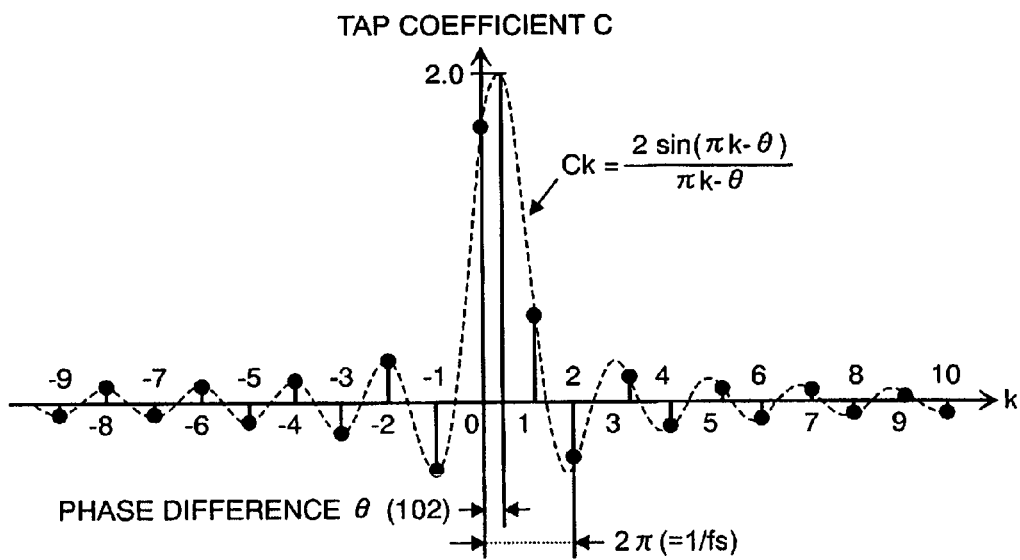
FIG. 6 is a view for explaining the first embodiment, according to the present invention.

FIG. 6 shows the details of the up-raters (103) and (104) to be applied in the first embodiment of the present invention.

This FIG. 6 shows tap coefficients of the filter, which can be obtained through the Fourier transformation of the frequency characteristics shown in FIG. 5. In this instance, each the tap coefficient Ck (however, k is an integer) becomes a sinc function, which is well-known in general, and it comes to be Ck=2 sin(πk−θ)/(πk−θ) by shifting (−θ) for compensating the phase difference θ (102) of sample for each pixel. However, in the up-tater (103), it is enough to make Ck=2 sin(πk)/(πk) by putting the phase difference θ (102) into 0. Also, by expressing the phase difference θ (102) by the phase difference of a an integer pixel unit (2π)+ the phase difference of a decimal pixel unit, it is possible to achieve the compensation upon the phase difference of integer pixel unit through a simple pixel shifting while using filters of the up-raters (106) and (108) mentioned above for compensation upon the phase difference of the decimal pixel unit.

Figure 7A:
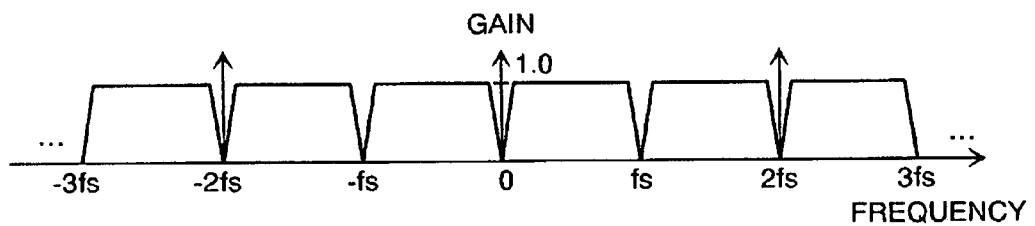
FIGS. 7(a) and 7(b) are views for explaining the first embodiment, according to the present invention.
Figure 7B:
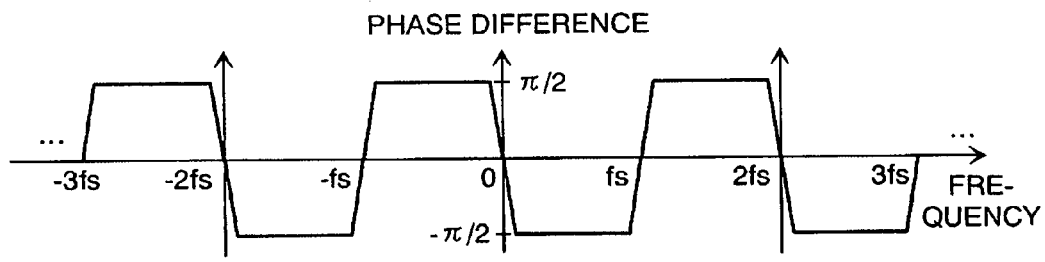

FIGS. 7(a) and 7(b) show examples of the operations of the π/2 phase shifters (106) and (108) to be applied in the first embodiment of the present invention. As the π/2 phase shifters (106) and (108), it is possible to use the Hilbert Transformers (106) and (108) which are well known in general. In FIG. 7(a), the horizontal axis shows the frequency while the vertical axis the gain (i.e., a value of ratio on an amplitude of the output signal to that of the input signal), i.e., the "frequency-gain" characteristics of the Hilbert Transformers. Herein, within the Hilbert Transformers, applying the frequency being two (2) times high (2 fs) with respect to the sampling frequency (fs) of the original signal as a new sampling frequency, and having a bandwidth at gain 1.0 for all the frequency components, except for 0 between −fs and +fs. Also, in FIG. 7(b), the horizontal axis shows the frequency while the vertical axis the phase difference (i.e., the difference in the phase of an output signal with respect to the phase of an input signal), and it represents the "frequency-gain" characteristics of the Hilbert Transformers. Herein, the frequency component between 0 and fs is delayed in the phase by only π/2, while the frequency component between 0 and −fs is advanced in the phase by only π/2. In this instance, as is shown in the figures, a characteristic can be obtained, repeating at every frequency of n×2 fs (n: an integer), due to the symmetry of the digital signal.

Figure 8:
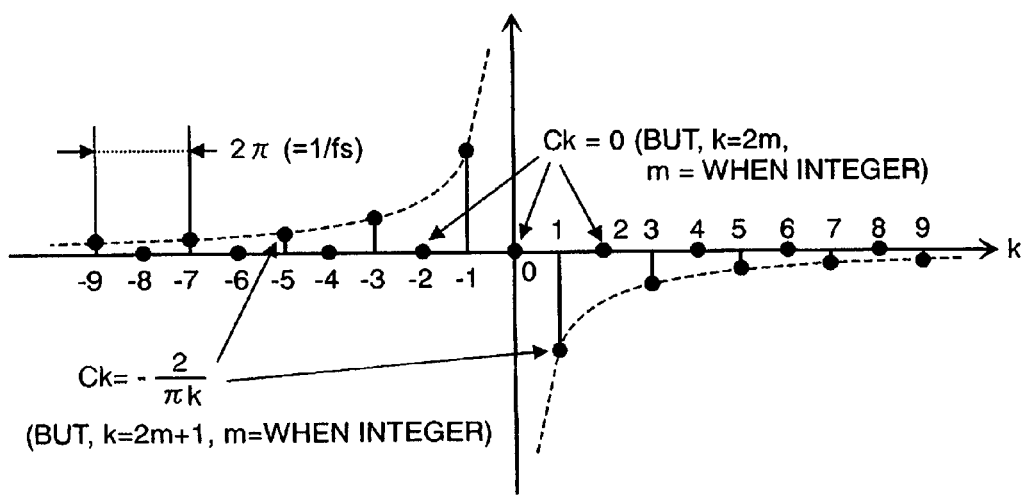
FIG. 8 is a view for explaining the first embodiment, according to the present invention.

FIG. 8 shows an example of constructing the π/2 phase shifters (106) and (108), to be applied in the first embodiment of the present invention, with the Hilbert Transformers. The same figure shows tap coefficient of a filter, which can be obtained through the Fourier inversion of the frequency characteristics shown in FIGS. 7(a) and 7(b). In this instance, it is enough to make each the tap coefficient Ck=0 when k=2 m (however, m is an integer), or Ck=−2/(πk) when k=2 m+1.

However, as the π/2 phase shifters (106) and (108), to be applied in the first embodiment of the present invention, it is also possible to apply differentiators. In this case, when differentiating general equation cos(ωt+α) by t and multiplying by 1/ω, then d(cos(ω+α))/dt*(1/ω)=−sin(ωt+α)=cos(ωt+α+π/2), i.e., it is possible to achieve the function of π/2 phase shifting. Thus, it is also possible to obtain the π/2 phase shifting function by applying a filter having 1/ω "frequency-amplitude" characteristic after taking the difference between the value of pixel to be target and that of the pixel neighboring thereto.

FIGS. 9(a) to 9(d) show the operations of the coefficient determining portion (109) to be applied in the first embodiment of the present invention and the details thereof. As is shown in FIG. 9(a), if determining the coefficients to be multiplied with each component in such a manner that the component on the Re axis be 1 while the component on the Im axis 0 when obtaining the vectorial sum of the four (4) components shown in FIG. 4(b), as well as, both components on the Re axis and the Im axis be 0 when obtaining the vectorial sum of the four (4) components shown in FIG. 4(c), then it is possible to achieve the video signal processing apparatus enabling to obtain the high resolution of two (2) times in the one-dimensional direction with using only two (2) pieces of the frame pictures. As shown in FIG. 1, when satisfying the condition shown in FIG. 9(a), by making the coefficient C0 to the output of the retarder (105) (i.e., sum of the original component and the aliasing component of the frame #1 after the up-rating), the coefficient C1 to the output of the π/2 phase shifter (106) (i.e., sum of results of the π/2 phase shifting on each the original component and the aliasing component of the frame #1 after the up-rating), the coefficient C3 to the output of the Hilbert Transformer (106) (i.e., sum of results of the π/2 phase shifting on each the original component and the aliasing component of the frame #2 after the up-rating), then simultaneous equations can be obtained as shown in FIG. 9(b) from the phase relationships of the respective components shown in FIGS. 4(b) and 4(c), and then dissolving those equations can lead the result as shown in FIG. 9(c). It is enough, for the coefficient determining portion (109), to output the coefficients C0, C1, C2 and C3, in this manner.

As an example, the values of the coefficients C0, C1, C2 and C3 are shown in FIG. 9(d), when changing the phase difference θ (102) from 0 to 2π at every π/8. This corresponds to the case when conducting motion estimation upon a signal of the original frame #2 with accuracy of 1/16 pixel, and thereby conducting the motion compensation upon the frame #1. In case where the value of the phase difference θ (102) is less than zero (0), or equal or greater than 2π, it is enough to bring the phase difference θ (102) to be within a region from 0 to 2π, by adding or subtracting a value, which is obtained by multiplying an integer on 2π, to/from the value of the phase difference θ (102), with using periodicity of the sin function or the cos function.

However, the up-raters (103) and (104) and the π/2 phase shifters (106) and (107) necessitate an infinity number of taps for obtaining an ideal characteristics thereof, however there is no problem from a practical viewpoint if simplifying them by cutting the number of taps down to a finite number of taps. In this instance, it is possible to apply a general window function (such as, a handing window function and a hamming window function, for example). By bringing the coefficients for each of taps of the simplified Hilbert Transformer into values, being bilaterally symmetric around C0, i.e., C(−k)=−Ck (k: an integer), it is possible to shift the phase by a predetermined amount.

By constructing each portion as was mentioned above, it is possible to achieve the high resolution with less number of frames and also with simplified structures thereof.

Embodiment 2

Figure 10:
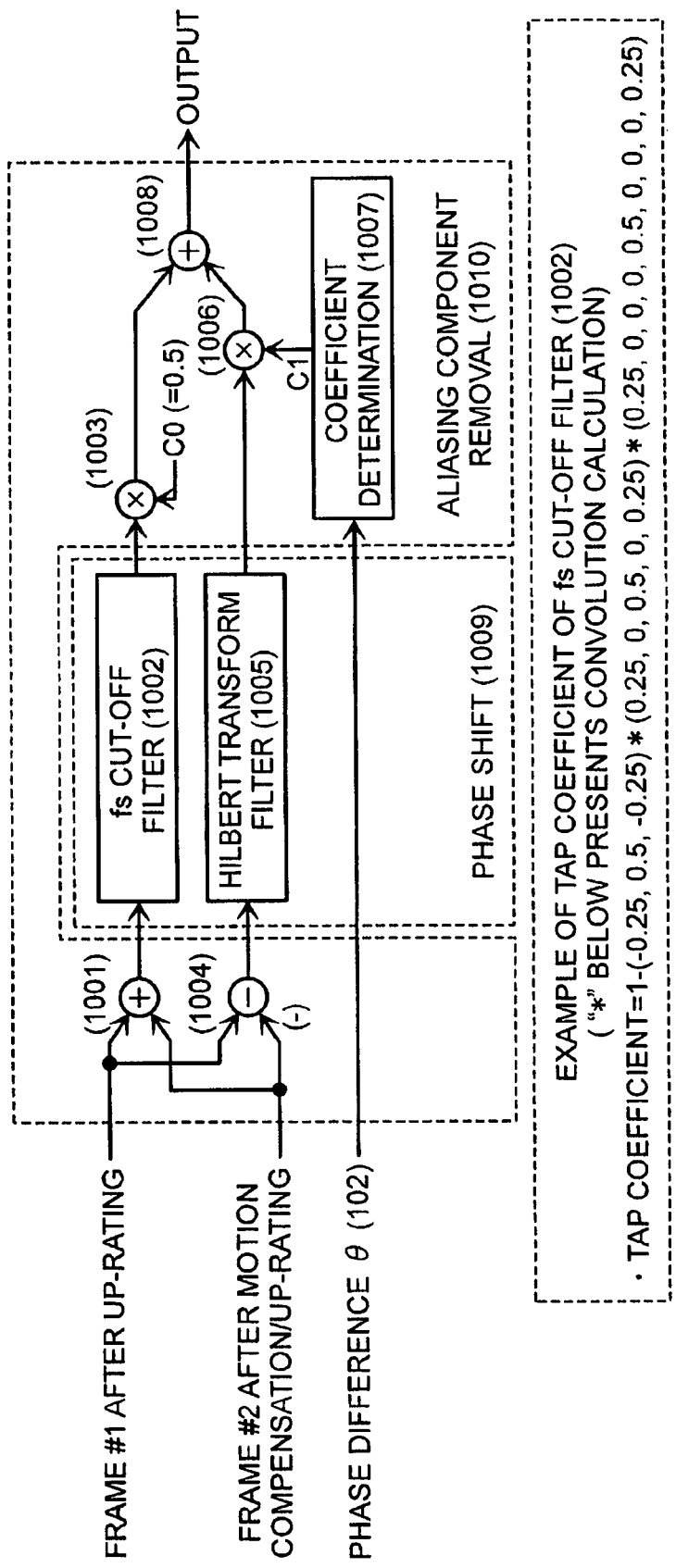
FIG. 10 is a view for explaining a second embodiment, according to the present invention.

FIG. 10 shows a second embodiment according to the present invention. The structures shown in this figure are obtained by simplifying the structures shown in FIG. 1, with using the relationship among the coefficients C0, C1, C2 and C3 shown in FIG. 9(c). Thus, since C0=C2=½ and C1=−C3=−(1+cos θ)/2 sin θ, the signals of sum and difference are produced by means of an adder (1001) and a subtractor (1004), from the frame #1 and the frame #2 after the motion compensation and up-rating. With the sum signal, after passing through a fs cut-off filter (1002), it is inputted into an adder (1008) with multiplying by C0 (=0.5) within a multiplier (1003). Herein, the fs cut-off filter (1002) is for cutting off the components of the sampling frequency (fs) before up-rating as a zero point, and it can be achieved by using the tap coefficients shown in (1011) of FIG. 10, for example. The propose of providing this fs cut-off filter (1002) lies to prevent unnecessary component of frequency fs from remaining, since the aliasing component cannot be removed from, because the gain comes down to zero point at the frequency fs on the "frequency-gain" characteristics of the Hilbert Transformer (1005), as shown in FIG. 7(a). Accordingly, if applying a means for enabling π/2 phase shifting, including the component of frequency fs, in the place of the Hilbert Transformer (1005), then this fs cut-off filter (1002) is unnecessary.

On the other hand, the difference signal, after being shifted in the phase by a predetermined amount (==/2) within the Hilbert Transformer (1005), is multiplied by the coefficient C1, which is determined upon basis of the phase difference (102) within a coefficient determining portion (1007), within the adder (1008), thereby obtaining an output. Herein, a phase shift portion (1009), comprising the retarder (1002) and the Hilbert Transformer (1005), can be achieved with a circuit scale being half (½) of the phase shift portion (116) shown in FIG. 1. Also, it is enough for the coefficient determining portion (1007) to output the coefficient C1 shown in FIG. 9(c), then an aliasing component removal portion (1010), including the adder (1001), the subtractor (1004), the multipliers (1003) and (1006), the adder (1008) and the coefficient determining portion (1007), can be reduced of the number of pieces of the multipliers, and therefore it can be achieved with the circuit scale being smaller than that of the aliasing component removal portion (117) shown in FIG. 1.

Embodiment 3

Figure 11:
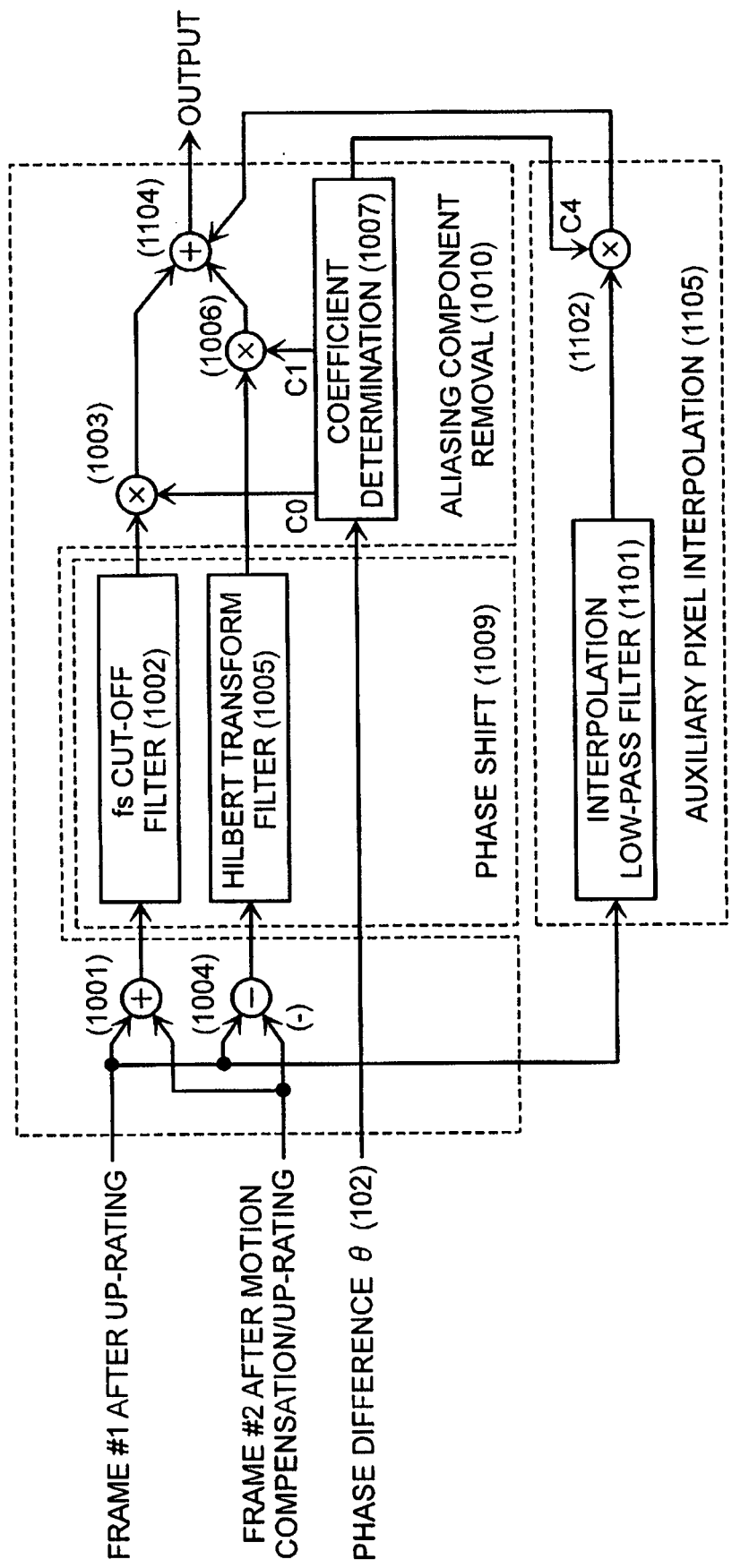
FIG. 11 is a view for explaining a third embodiment, according to the present invention.

FIG. 11 shows a third embodiment according to the present invention. The structures shown in this figure is constructed upon basis of the structures shown in FIG. 10, enabling to change an output from an auxiliary pixel compensation portion (1105) when the phase difference θ comes close to zero (0), for the purpose of preventing the coefficients C1 and C3 from becoming unstable when the phase difference θ is zero (0), as shown in FIG. 9(d), and/or preventing the coefficients C1 and C3 from becoming weak against noises due to becoming large as the phase difference θ comes close to zero (0). Thus, a general interpolation low-pass filter (1101) is prepared as a bypass route, while C4 is newly produced other than the above-mentioned coefficients C0 and C1 within the coefficient determining portion (1103), and an output of the interpolation low-pass filter (1101) is multiplied by the coefficient C4 within the multiplier (1102), and thereafter it is outputted after being added onto the signal of high resolution within the adder (1104). Other structures than those are same to those shown in FIG. 10.

Figure 12:
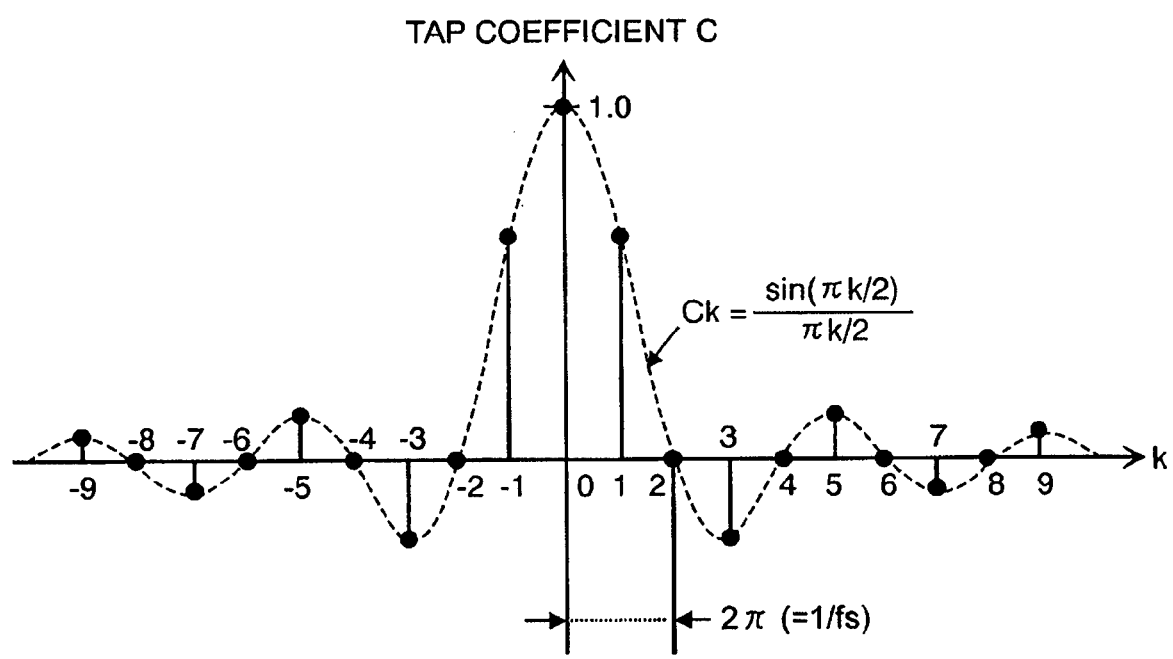
FIG. 12 is a view for explaining the third embodiment, according to the present invention.

FIG. 12 shows a detailed example of the interpolation low-pass filter (1101) to be applied in the third embodiment, according to the present invention. This FIG. 12 shows the tap coefficients of filters obtained through the Fourier inversion of the frequency characteristics, taking a half (½) of the original sampling frequency fs as the cut-off frequency. In this instance, each of the tap coefficients Ck (however, k: an integer) comes to be a general sinc function, and therefore it is enough to put Ck=sin(πk/2)/(πk/2). FIG. 13 shows the detailed example of the coefficient determining portion (1103) to be applied into the third embodiment of the present invention. In this figure is shown operation of, although the new coefficient C4 is usually zero (0) upon basis of the coefficients C0 and C1 shown in FIG. 9(d), however setting values of the coefficients C0 and C1 to zero (0), compulsively, when the phase difference θ comes close to zero (0), as well as, setting the value of the coefficient C4 to 1.0. With this operation, in the structures shown in FIG. 11, it is possible to change an output of the adder (1104) to an output of the interpolation low-pass filter (1101), automatically, when the when the phase difference θ (102) comes close to zero (0). However, it is also possible to change the coefficients from those shown in FIG. 12 to those shown in FIG. 13, continuously, accompanying with approaching of the difference θ to zero (0). Also in case when determining that the pixel corresponding to the pixel as the processing target on the frame #1 does not lie on the frame #2, it is possible to change the output of the adder (1104) to an output of the interpolation low-pass filter (1101), automatically, by controlling the respective coefficients, in the similar to that when the phase difference θ (102) comes close to zero (0).

Embodiment 4

Figure 14:
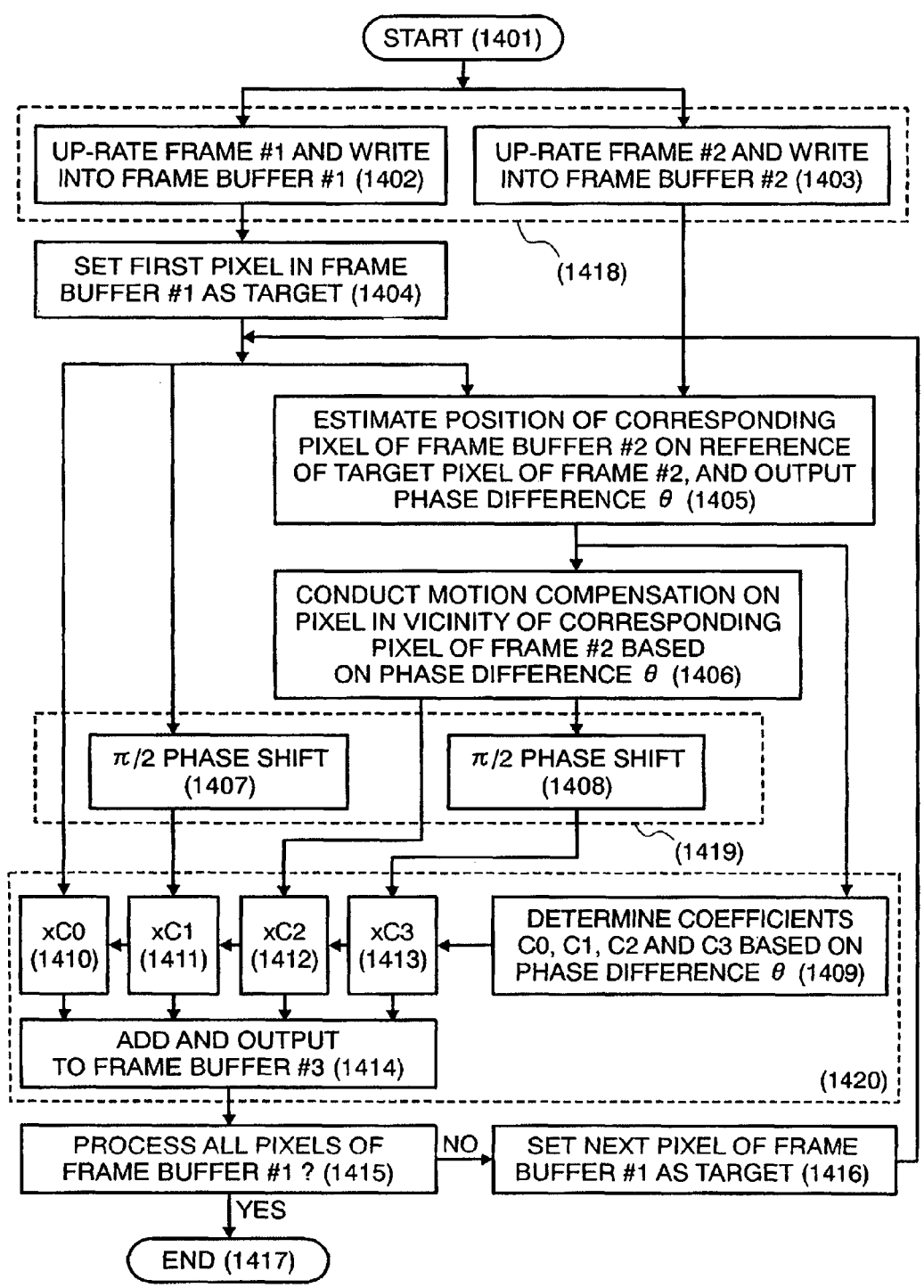
FIG. 14 is a view for explaining a fourth embodiment, according to the present invention.

FIG. 14 shows a fourth embodiment according to the present invention. This figure shows an embodiment of achieving the same operations as the embodiment 1 mentioned above, but through software program. In this figure, the processing starts from a step (1401), and the video data of each of the frames are up-rated up to two (2) times in a step (1418). Thus, in a step (1402) is up-rated the video data of the frame #1 to be written into a frame buffer #1, and in a step (1402) is up-rated the video data of the frame #2 to be written into a frame buffer #2. Herein, the up-rating can be achieved by writing data for every second pixel after once clearing values of each of the frame buffers to zero (0).

Next, in a step (1404), the first pixel (for example, the pixel at the upper left) of the frame buffer #1 is set to be the processing target, and then the processing is looped until the processing is completed upon all the pixel data with respect to the frame buffer #1.

In a step (1405), estimation is made on a position of the corresponding pixel within the frame buffer #2, upon basis of the target pixel of the frame buffer #1, thereby outputting the phase difference θ. In this instance, as the method for estimating the position of the corresponding pixel can be applied the conventional technology mentioned above, as it is.

In a step (1406), upon basis of the phase difference θ obtained in the step (1405), motion compensation is conducted upon the pixels in the vicinity of the corresponding pixel within the frame buffer #2. In this instance, as the pixels in the vicinity thereof, the compensation may be made on the video data to be used in the process of π/2 phase shifting in a step (1408), i.e., only the pixel data within a region where the infinite tap number acts. The operation of this motion compensation is same to that explained by referring to FIGS. 5 and 6.

Following to the above, in a step (1419) is conducted phase shifting by a predetermined amount upon the frame buffer #1 and the frame buffer #2, on which the motion compensation is made. Thus, in the steps (1407) and (1408), the pixel data within each of the frame buffers is shifted in the phase thereof by π/2.

Following to the above, in a step (1420), the pixel data of the frame buffers #1 and #2 are removed the aliasing components thereof, upon basis of the phase difference θ, to be outputted to a frame buffer #3. Thus, in a step (1409), the coefficients C0, C1, C2 and C3 are determined upon basis of the phase difference θ, and are multiplied with the pixel data of the frame buffers #1 and #2 and the data after the π/2 phase shifting, respectively, in the steps (1410), (1411), (1412) and (1413), and thereafter all of them are added to be outputted to the frame buffer #3. The operation of removing the aliasing component is same to that explained by referring to FIG. 9 in the above.

Following to the above, in a step (1415), determination is made on whether the processing is completed or not on all pixels of the frame buffer #1. If determining that it is not completed, after setting the next pixel (for example, the pixel at the right-hand neighbor) as the processing target in a step (1416), the process turns back to those in the steps (1405) and thereafter. On the other hand, if determining that it is completed, the process is ended in a step (1417).

With such the processing as was mentioned above, it is possible to output a high-resolution signal to the frame buffer #3. In case when applying to the moving picture, it is enough to repeat the processes starting from the step (1401) and reaching to the step (1417).

Embodiment 5

Figure 15:
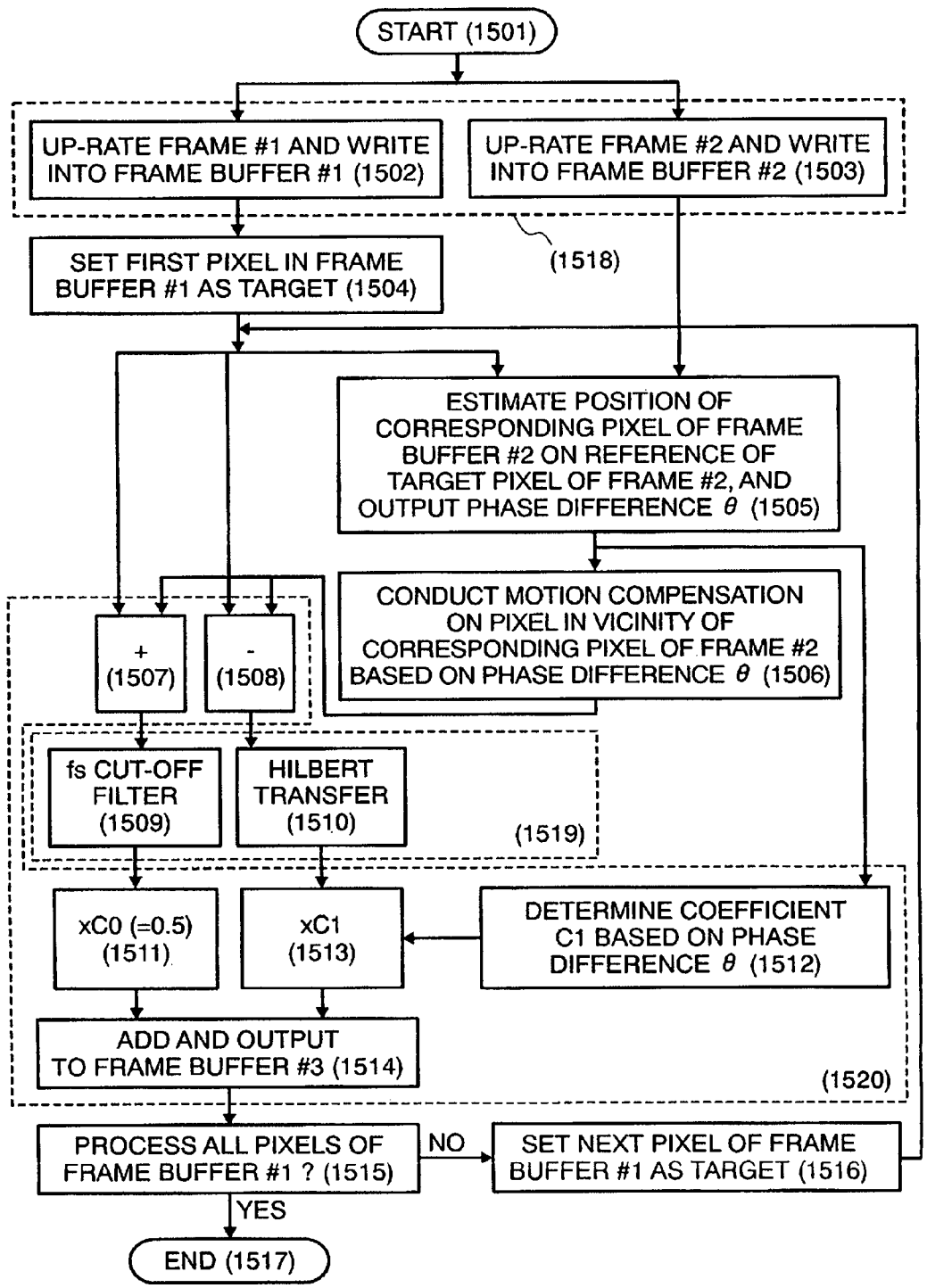
FIG. 15 is a view for explaining a fifth embodiment, according to the present invention.

FIG. 15 shows a fourth embodiment according to the present invention. This figure shows an embodiment of achieving the same operations as the embodiment 2 mentioned above, but through software program. In this figure, the processing starts from a step (1501), and the video data of each frame are up-rated in a step (1518). Thus, in a step (1502) is up-rated the video data of the frame #1 to be written into the frame buffer #1, and in a step (1503) is up-rated the video data of the frame #2 to be written into a frame buffer #2. Herein, the up-rating can be achieved by writing data for every second pixel after once clearing values of each of the frame buffers to zero (0).

Next, in a step (1504), the first pixel (for example, the pixel at the upper left) of the frame buffer #1 is set to be the processing target, and then the processing is looped until the processing is completed upon all the pixel data with respect to the frame buffer #1.

In a step (1505), estimation is made on a position of the corresponding pixel within the frame buffer #2, upon basis of the target pixel of the frame buffer #1, thereby outputting the phase difference θ. In this instance, as the method for estimating the position of the corresponding pixel can be applied the conventional technology mentioned above, as it is.

In a step (1506), upon basis of the phase difference θ obtained in the step (1405), motion compensation is conducted upon the pixels in the vicinity of the corresponding pixel within the frame buffer #2. In this instance, as "the pixels in the vicinity" thereof, the compensation may be made on the video data to be used in the process of the Hilbert Transform in a step (1510), i.e., only the pixel data within a region where the infinite tap number acts. The operation of this motion compensation is same to that explained by referring to FIGS. 5 and 6.

Following to the above, in a step (1520), the pixel data of the frame buffers #1 and #2 are removed the aliasing components thereof, upon basis of the phase difference θ, and are outputted to the frame buffer #3. First, in a step (1507), the value of the pixel data in the frame buffer #1 and the value of the pixel data in the frame buffer #2, upon which the motion compensation is made, are added, and are cut off the components of frequency fs in a step (1509). The function of this fs cut-off filter (1509) is same to that (1002) shown in FIG. 10.

Also, in a step (1508), the value of the pixel data in the frame buffer #2, upon which the motion compensation is made, is subtracted from the value of the pixel data in the frame buffer #1. Herein, upon the result of that subtraction is made the phase shifting by a predetermined amount, in a step (1519). Thus, in the similar manner, also with using the data in vicinity of the subtraction, the Hilbert Transformation is conducted in a step (1510). The operation of this phase shifting is same to that explained by referring to FIGS. 7 and 8 mentioned above.

Following to the above, the data after the addition mentioned above is multiplied by the coefficient C0 (=0.5) in a step (1511), as well as, the coefficient C1 is determined upon basis of the phase difference θ. In a step (1513), the coefficient C1 and the data after the Hilbert Transformation are multiplied, and thereafter both data are added in a step (1514) to be outputted into the frame buffer #3. The operation of removing the aliasing component is same to that explained by referring to FIG. 10.

Following to the above, in a step (1515), determination is made on whether the processing is completed or not upon all pixels of the frame buffer #1. If it is not yet completed, after setting the next pixel (for example, the pixel at the right-hand neighbor), the process turns back those steps (1505) and thereafter, on the other hand, if it is completed, the process is ended in a step (1517).

With such the processing as was mentioned above, it is possible to output a high-resolution signal to the frame buffer #3. In case when applying to the moving picture, it is enough to repeat the processes starting from the step (1501) and reaching to the step (1517).

Embodiment 6

Figure 16:
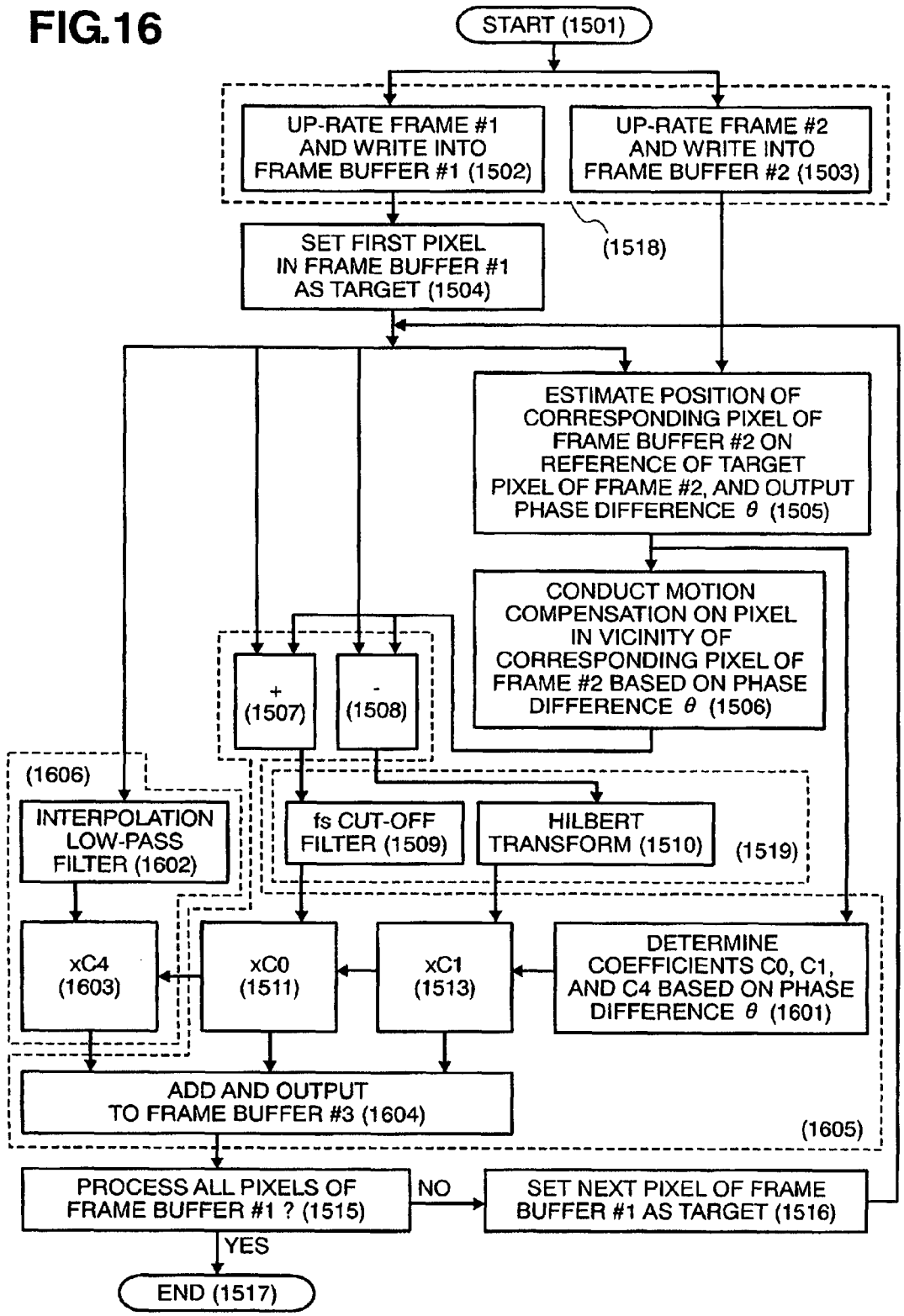
FIG. 16 is a view for explaining a sixth embodiment, according to the present invention.

FIG. 16 shows a sixth embodiment according to the present invention. This figure shows an example of achieving the same operation as the third embodiment mentioned above, but through software program. The processing steps and the operations shown in this figure are made, so that a processing result of a step (1606) is outputted into the frame buffer #3 when the phase difference θ comes close to zero (0), upon basis of the processing steps shown in FIG. 15, for the purpose of preventing the coefficients C1 and C3 from becoming unstable when the phase difference θ is zero (0), as shown in FIG. 9(d), and/or preventing the coefficients C1 and C3 from becoming weak against noises due to becoming large as the phase difference θ comes close to zero (0). Thus, the coefficients C0, C1 and C4 are determined upon basis of the phase difference θ in a step (1601), and a general interpolation low-pass filtering process is conducted with using the pixel data as target within the frame buffer #1 and the pixel data in the vicinity thereof, in a step (1602). Thereafter, multiplication is made by the coefficient C4 in a step (1603), and then addition is made with the outputs of the steps (1511) and (1513) in a step (1604), thereby to be outputted into the frame buffer #3. Others than those are same to the operations shown in FIG. 15. Further, the operation of determining the coefficients in the step (1601) is same to that explained by referring to FIG. 13 mentioned above. Also, the operation of the interpolation low-pass filter in the step (1602) is same to the operation explained by referring to FIG. 12 mentioned above.

Since hardware for functioning the processing steps shown in FIGS. 14, 15 and 16 mentioned above can be obtained, easily, with a general video processing equipment and a computer, etc., which is constructed with a signal input/output portion (I/O), a CPU (Central Processing Unit) and a signal processing LSI, such as, DSP (Digital Signal Processor), and frame buffers (memory).

With such technology as mentioned above, it is possible to obtain the video signal processing for achieving the 2-times high resolution in the one-dimensional direction, if there is at least two (2) pieces of frame pictures.

Differences will be explained, in particular, in the operations between the present invention and the conventional technology mentioned above, by referring to FIGS. 17(a) to 17(c). In FIG. 17(a), among frames from a frame #1 (1701) to a frame #5 (1705), input pictures are prepared such that an object to be photographed moves into the right-hand direction. In this instance, as is shown in FIG. 17(b), the object is shifted, intentionally, in such a manner that the position of corresponding pixels shifts by ¼ pixel (=π/2) between the frame #1 (1701) and the frame #2 (1702), by 1 pixel (=2π) between the frame #1 (1701) and the frame #3 (1703), by 5/4 pixel (=5π/2) between the frame #1 (1701) and the frame #4 (1704), and by 2 pixel (=4π) between the frame #1 (1701) and the frame #5 (1705), respectively, judging from the sampling phases of the respective frames. In this instance, the phases of the respective aliasing components can be presented as shown in FIG. 17(c), upon basis of the phase of the aliasing components contained in the signals on the frame #1 (1701). In case when conducting the 2-times high resolution upon this input picture (a), according to the conventional technology, since the vectorial sum of the aliasing components cannot be made zero (0) even with using any three (3) pieces of frames within the frames #1 (1701) to #5 (1705), therefore it is impossible to achieve the high resolution. On the other hand, with applying the present embodiment, since the vectorial sum of the aliasing components can be made zero (0) with two (2) pieces of frames neighboring to each other (for example, the frame #1 (1701) and the frame #2 (1702), it is possible to achieve the high resolution. Thus, with using the input picture shown in FIG. 17(a) as a test patter, it is possible to confirm the operation condition of the present embodiment.

Embodiment 7

Although the explanation was made on the 2-times high resolution with using two (2) pieces of frames in the above, however n-times high resolution can be achieved by using the signals of n pieces of frames (n: an integer larger equal to or larger than two (2)). In this instance, as was shown in FIG. 9(a) mentioned above, under the condition that the Re axis of sum of the original components=1 and the Im axis of sum of the original components=0, it is enough to dissolve simultaneous equations while putting the vectorial sum of (n−1) pieces of the aliasing components zero (0), each being aliased from the frequency being high 1−(n−1) times as the original sampling frequency (fs). Hereinafter, detailed explanation will be made on the above, by referring to FIGS. 18 and 19(a) and 19(b).

Figure 18:
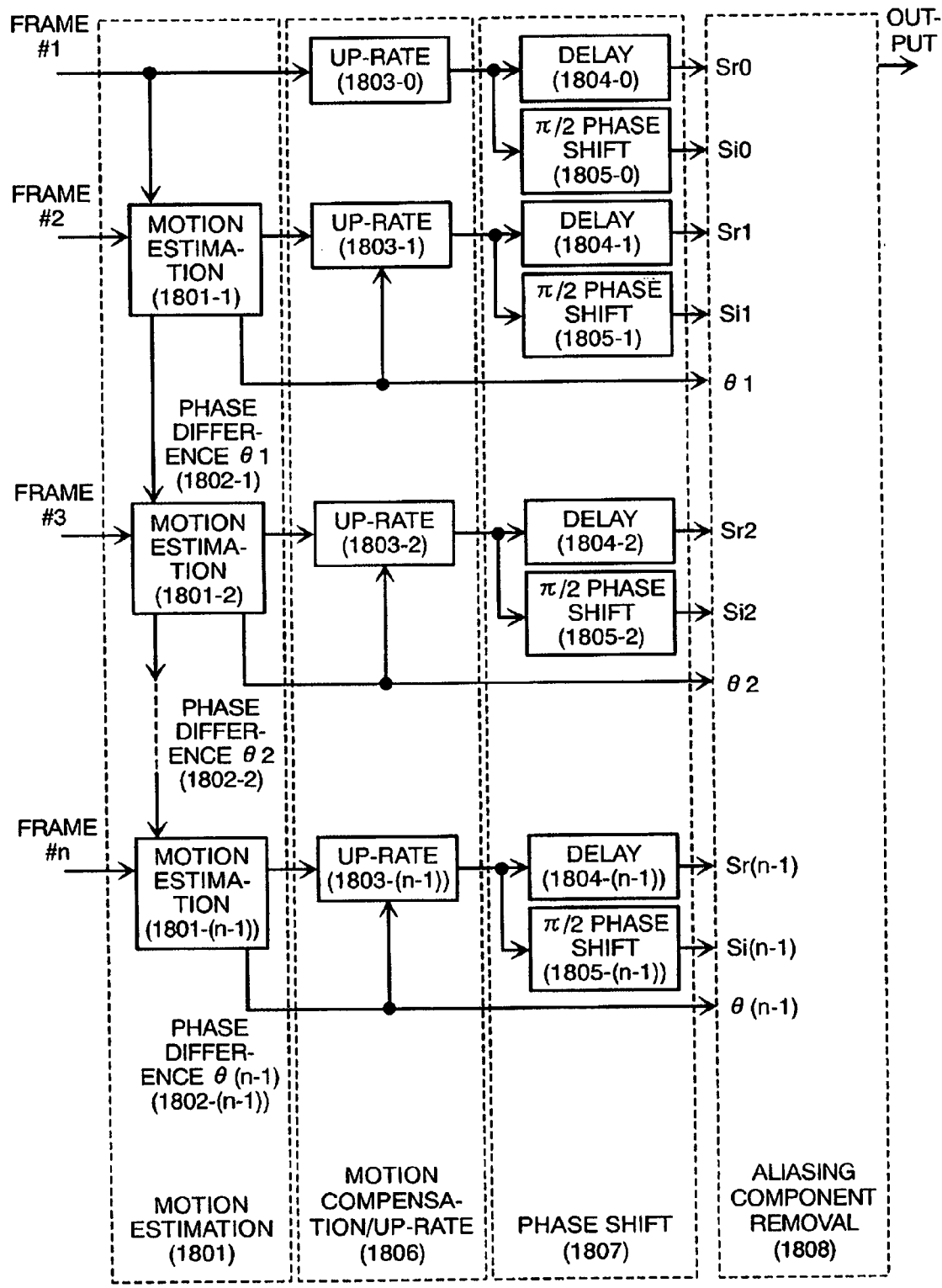
FIG. 18 is a view for explaining a seventh embodiment, according to the present invention.

In FIG. 18 is shown an embodiment of an apparatus for achieving the n-times high resolution with using n pieces of frames (n: an integer equal to or larger than two (2)). In this figure, first of all, estimation is made on the positions of the corresponding pixels on the frame #2 to the frame #n inputted, on a criterion of the sampling phase (or the sampling position) of the pixel of the processing target on the frame #1 inputted, thereby obtaining the phase differences θ1 (1802-1) to θ(n−1)) (1802-(n−1)). Next, by up-raters (1803-0) to (1803-(n−1)) of a motion compensation/up-rate portion (1806), motion compensation is conducted on the frame #2 through the frame #n with using the information of each of the phase differences θ, so as to fit the position thereof to that of the frame #1, and at the same time, the pixel numbers of the respective frames are increased up to n-times, respectively, and thereby obtaining the high-resolution. In a phase shift portion (1807), the phase of this data of high resolution is shifted by a predetermined amount, thereby obtaining Si0 to Si (n−1). Herein, as a means for shifting the phase of data by the predetermined amount, it is possible to apply π/2 phase shifters (1805-0) to (1805(n−1)). Also, for compensating the delay caused in each of the π/2 phase shifters, signals of the respective frames of high resolution are delayed by the retarders (1804-0) to (1804(n−1)), thereby obtaining signals Sr0 to Sr(n−1). In an aliasing component removal portion (1808), computation is made for removing the aliasing components with using those signals Si0 to Si(n−1) and Sr0 to Sr(n−1) and the phase differences θ1-θ(n−1), thereby obtaining an output. However, in a motion estimation portion (1801) can be implemented with using the conventional technology mentioned above as it is. Also, with the motion compensation/up-rate portion (1806) and the phase shift portion (1807), since they can be easily inferred and obtained by changing the frequency in the figure from fs to fs*π/2, therefore they are omitted to be shown in the figure. However, in case when the aliasing distortion cannot be removed because the gain of frequency fs*π/2 comes to zero point, it is preferable to apply a cut-off filter of making the gain of frequency fs*π/2 zero point. This cut-off filter may be inserted at the position of the retarders (1804-0) to (1804-n−1), however it is apparent that similar effect can be obtained by inserting it at the position of an output of the aliasing component removal portion (1808).

FIGS. 19(a) and 19(b) show the details of operations of the aliasing component removal portion (1808). In FIG. 19(a) is shown an equation for obtaining an output, being removed the aliasing components thereof by using the signals Si0 to Si(n−1) and Sr0 to Sr(n−1) and the phase differences θ1-θ(n−1). Herein, Ci0 to Ci (n−1) and Cr0 to Cr (n−1) are coefficients to be multiplied onto the Si(n−1) and Sr0 to Sr(n−1), respectively.

In FIG. 19(b) are shown an equation for obtaining those coefficients Ci0 to Ci (n−1) and Cr0 to Cr (n−1). The equation is in the from of the matrix format, on both the left side and the right side, and at every second line from the above, there are shown the original component, the component of the sampling frequency (fs), and the 2 times component of the sampling frequency (fs), and in the same manner, are shown the components until (n−1) times of the sampling frequency (fs). At every first line (i.e., an odd number line) is shown the component of the Re axis, and at every second line (i.e., an even number line) the component of the Im axis, respectively. The matrix at the left side of the same equation indicates that the sum of the original components on the Re axis is 1, and that all of the other components are 0. The right side of the same equation is made of the product calculation. In the matrix on the left of the right side, every second column from the left indicates that the vector having length 1 is rotated depending on the sampling phase (reference) and the sampling phase difference between the frame #2 and the frame #1, and hereinafter, in the same manner, depending on the frame #n and the sampling phase difference of the frame #1. Every first column (i.e., an odd number column) shows a value obtained by projecting the vector of length 1 onto the Re axis, and every second column (i.e., an even number column) a value obtained by projecting the vector of length 1 onto the Im axis, respectively. Herein, every second line from the above has a feature that the sampling phase difference (i.e., a rotation angle) becomes large in proportion to the sampling frequency. The matrix at the right of the right side is the coefficient to be obtained. Thus, the equation shown in FIG. 19(b) shows that vector sum is taken after multiplying each component of the frame #1 to the frame #n by an appropriate coefficient, for extracting only the Re axis of the original component while removing the aliasing component. Accordingly, by obtaining the coefficients Ci0 to Ci (n−1) and Cr0 to Cr (n−1) through the reverse matrix calculation shown in FIG.

19(b) and calculating the equation with putting those coefficients into FIG. 19(b), it is possible to remove the unnecessary (n−1) pieces of aliasing components, and thereby achieving the n-times high resolution. In this instance, when putting n=2, the configuration shown in FIG. 18 coincides with that shown in FIG. 1, and the equations shown in FIGS. 19(a) and 19(b) with those shown in FIGS. 9(a) to 9(d). Also, in the similar manner, the number of the input frames, which are shown in the embodiments (i.e., the flowcharts) shown in FIGS. 14, 15 and 16, can be extended, easily, from 2 to n, and therefore illustration of a flowchart corresponding to the n-times high resolution is omitted herein.

Further, the explanation was made by listing up the high resolution in the horizontal direction, as an example, in the above; however, the present invention should not be restricted to this, but it can be also applied into the high resolution into the vertical direction and an oblique direction. For example, with application of the present invention into an interlace-progressive scanning conversion (i.e., I-P conversion), it is possible to produce one (1) piece of frame picture from two (2) pieces of the field pictures. Thus, with application of the present, with considering the field pictures as a "frame picture having ½ number of scanning lines", it is possible to obtain an output picture having 2-times number of scanning lines (i.e., 2-times resolution in the vertical direction) per one (1) piece of picture, irrespective of difference between the still picture and the moving picture. Also, the present invention can be extended, easily, for obtaining the two-dimensional high resolution combining into the horizontal and vertical directions.

Further, in the embodiments mentioned above, the explanation was made on the example of the video displaying apparatus, as the video signal processing apparatus; however, the present invention should not be restricted to this, and is applicable into, such as, a DVD player and a HDD player, etc., for example, in the same manner, and it is also needless to say that the present invention can be applied further to a mobile video display terminal for receiving so-called a one-segment broadcast (i.e., territorial digital broadcast in Japan, for sending a program (simple moving picture) directing to a mobile telephone). Also, as the video frame may be used a video frame of signals other than the television broadcasting signal. Thus, the present invention can be applied, in the similar manner, such as, streaming picture, which is broadcasted through the Internet, or the picture reproduced from the DVD player or the HDD player, for example.

Embodiment 8

Figure 20:
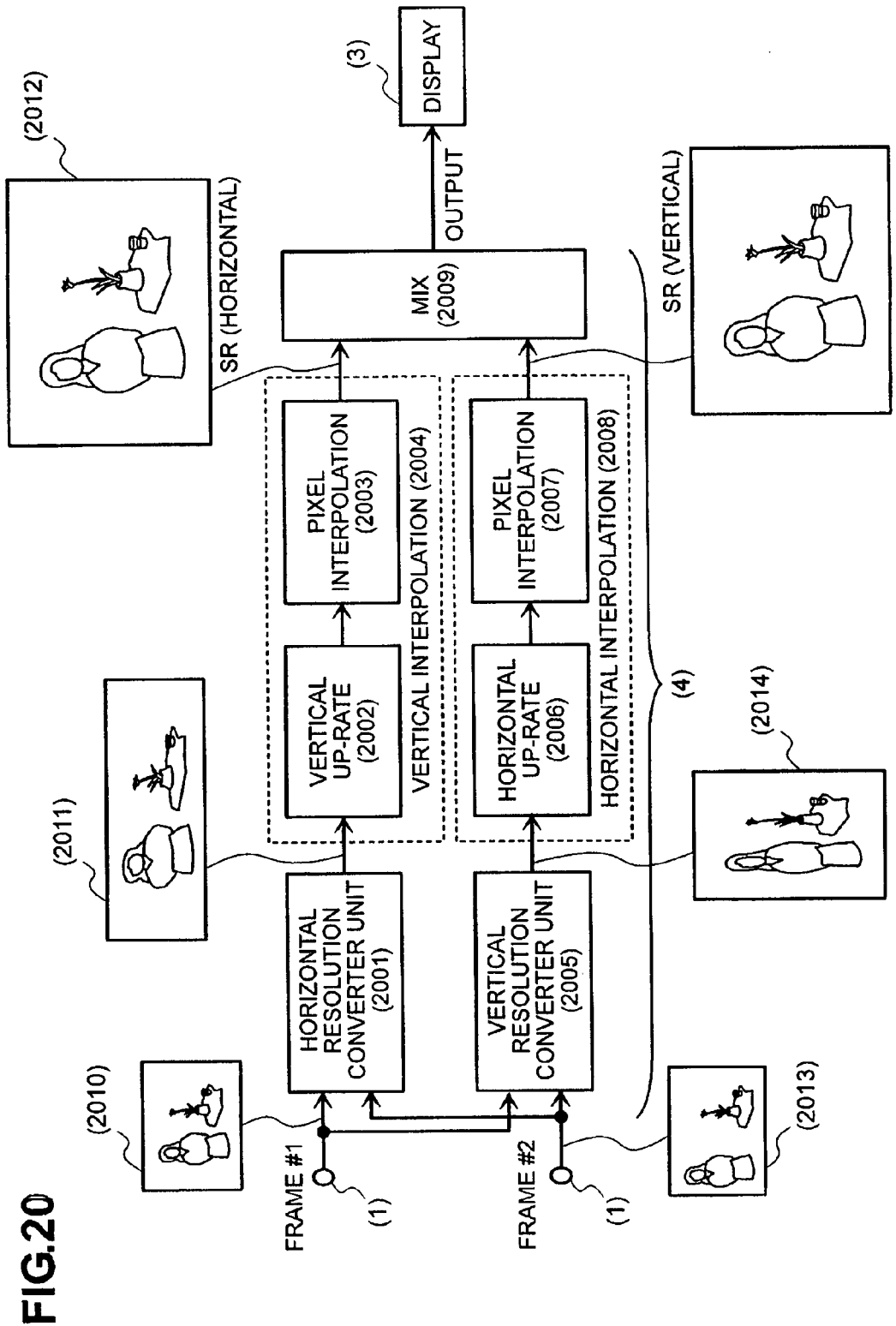
FIG. 20 is a view for explaining an eight embodiment, according to the present invention.

FIG. 20 shows a video signal processing apparatus, according to an eighth embodiment of the present invention. The video signal processing apparatus, according to the present embodiment, comprises: an input unit or portion (1), into which a train of frames of moving picture is inputted, such as, the television broadcast signal, for example, a resolution converter unit or portion (4) for combining the frames inputted from this input portion (1) in the horizontal/vertical directions, so as to achieve two-dimensional high resolution thereof, and further a display unit or portion (3) for displaying a picture thereon, upon basis of the frames, which are high-resolved in this resolution converter unit (4). In this resolution converter unit (4), resolution conversion is conducted in the horizontal direction and the vertical direction, respectively, and the component(s), being large in an effect of improving the resolution among the respective results thereof, is/are outputted, selectively or combined with, thereby achieving the two-dimensional high resolution. Hereinafter, explanation will be given on the details of the resolution converter unit (4).

In FIG. 20, upon the basis of the frame #1 (2010) and the frame #2 (2013), which are inputted into the input unit (1), with using a horizontal resolution converter unit or portion (2001) and a vertical resolution converter unit or portion (2005), there are produced a frame (2011), which is increased in the pixel number in the horizontal direction, and a frame (2014), which is increased in the pixel number in the vertical direction. Herein, each of the resolution converter units (2001) and (2005) conducts the signal processing in the horizontal direction or the vertical direction, respectively, with using the structures of the resolution converter unit (2) shown in FIG. 1. In this instance, within the horizontal resolution converter unit (2001), the up-raters (103) and (104), the retarders (105) and (107), the π/2 phase shifter (106) and (108), which are shown in FIG. 1, are so constructed that they achieve the up-rate in the horizontal direction, the retardation, and π/2 phase shifting, respectively. In the similar manner, within the vertical resolution converter unit (2005), the up-raters (103) and (104), the retarders (105) and (107), the π/2 phase shifters (106) and (108), which are shown in FIG. 1, are so constructed that they achieve the up-rate in the vertical direction, the retardation, and π/2 phase shifting, respectively. Those can be practiced with using the operations shown in FIGS. 5-8 and the conventional arts, etc.

In the present embodiment, assuming that a target to be pictured moves, two-dimensionally, into the horizontal/vertical directions, the operations shown in FIGS. 1 and 2 are extended into two-dimensions. Thus, in the position estimation unit (see (101) in FIG. 1) and a motion compensation/up-rate portion or unit (see (115) in FIG. 1) within the horizontal resolution converter unit (2001), two-dimensional motion compensation is conducted on the target on the frame #2 upon basis of the target on the frame #1, and at the same time, a horizontal phase difference "θH" among the sampling phase differences of the pixels in each frame is used in order to determine a coefficient of the aliasing component removal portion or unit (see (117) in FIG. 1). In the similar manner, in the position estimation unit (see (101) in FIG. 1) and a motion compensation/up-rate unit (see (115) in FIG. 1) within the vertical resolution converter unit (2005), two-dimensional motion compensation is conducted on the target on the frame #2 upon basis of the target (2016) on the frame #1, and at the same time, a vertical phase difference "θV" among the sampling phase differences of the pixels in each frame is used in order to determine a coefficient of the aliasing component removal unit (see (117) in FIG. 1). The determination of the coefficient in the aliasing component removal unit (see (117) can be achieved by using the operation shown in FIG. 9, as it is.

Assuming that the target moves in an oblique direction, distortion in the oblique direction should be included within the frame (2011) increasing the pixel number in the horizontal direction by means of the horizontal resolution converter unit (2001), but this distortion is negligible small on a component of the original input signal, which is low in the vertical frequency (i.e., a vertical line or the like). In the similar manner, distortion in the oblique direction should be included within the frame (2014) increasing the pixel number in the vertical direction by means of the vertical resolution converter unit (2005), but this distortion is negligible small on a component of the original input signal, which is low in the horizontal frequency (i.e., a horizontal line or the like).

With using such characteristics, the frame (2011), which is increased in the pixel number in the horizontal direction according to the signal processing mentioned above, produces a frame (2012) by means of a vertical compensation unit (2004) comprising a vertical up-rater (2002) and a pixel compensator (2003), as a SR (horizontal) signal. Herein, as the pixel compensator (2003), it is possible to use a general vertical low-pass filter, for outputting an averaged value of pixel data up/down the pixel to be compensated. In the similar manner, the frame (2014), which is increased in the pixel number in the vertical direction, produces a frame (2015) by means of a horizontal compensation unit (2008) comprising a horizontal up-rater (2006) and a pixel compensator (2007), as a SR (vertical) signal. Herein, as the pixel compensator (2003), it is possible to use a general vertical low-pass filter, for outputting an averaged value of pixel data left/right the pixel to be compensated. In this manner, extracting only the low-frequency components while removing the high-frequency components crossing the process target at right angles, with using the pixel compensators (2003) and, (2007), it is possible to lower or reduce the ill influences due to the distortions, which age generated when the target moves in the oblique direction, as was mentioned above, down to the negligible small. The SR signal (horizontal) signal and the SR (vertical) signal, which are produced in the processes mentioned above, are combined or mixed with in a mixer (2009), to be an output signal, and it is displayed on the display unit (3). The details and the operations of the mixer (2009) will be mentioned later.

Embodiment 9

Figure 21:
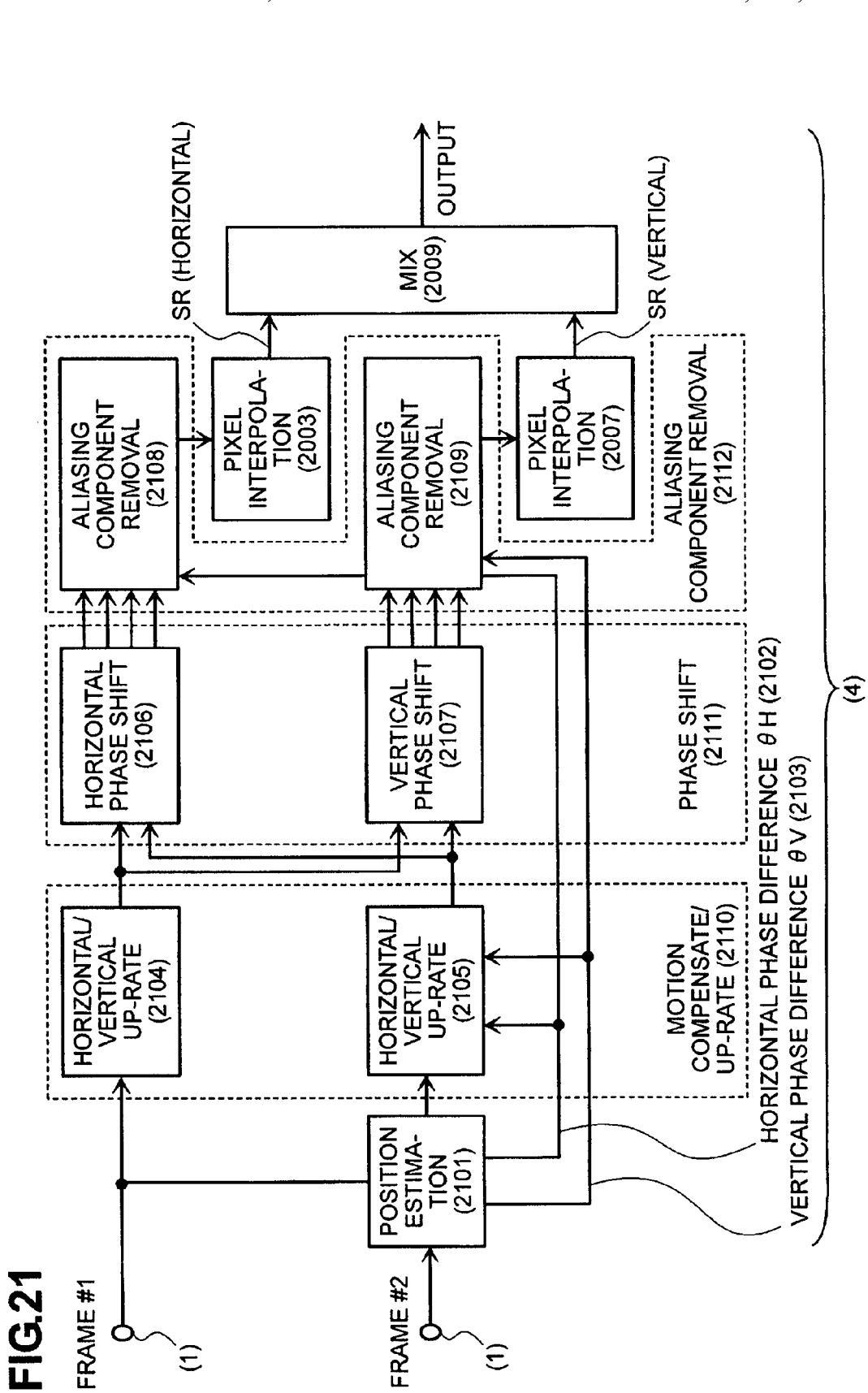
FIG. 21 is a view for explaining a ninth embodiment, according to the present invention.

FIG. 21 shows a video signal processing apparatus, according to a ninth embodiment of the present invention. The video processing apparatus according to the present embodiment is a variation of the structures of the eight embodiment mentioned above, wherein they are so constructed that the processing order of the resolution converter units (2001) and (2005) and the compensation units (2004) and (2008), which are shown in FIG. 20, are reversed, i.e., after completing the compensation process, the resolution conversion is conducted. With this, since the up-raters (i.e., (103) and (104) in FIG. 1) within the resolution converter units (2001) and (2005), and also the up-raters (i.e., (2002) and (2006) in FIG. 20) within the compensation units (2004) and (2008), can be shared, in common, and further the respective position estimation units (see (101) in FIG. 1) within the horizontal resolution converter unit (2001) and the vertical resolution converter unit (2005) can be shared, in common; therefore, it is possible to achieve the similar signal processing with a circuit scale and an amount of calculations, which are smaller than before.

In FIG. 21, firstly within a position estimation unit (2101), estimation is made on the position of the pixel on the frame #2 corresponding thereto, upon basis of a sampling phase (i.e., a sampling position) of the pixel of the processing target on the frame #1, which is inputted in the input unit (1), so as to obtain the sampling phase differences "θH" (2102) and "θV" (2103) in the horizontal direction and the vertical direction, respectively. Next, the up-raters (2104) and (2105) of the motion compensation/up-rate unit (2110) makes moving compensation upon the frame #2 with using the information of the phase differences "θH" (2102) and "θV" (2103), so as to fit to the frame #1 in the position, and at the same time, it increases the pixel numbers of the frames #1 and #2 up to 2-times, respectively, in the horizontal and vertical directions (in total, 4-times). The up-rater (2104) and (2105), each being obtained by extending the operations/structures shown in FIGS. 5 and 6 into two-dimensions, i.e., into the horizontal/ vertical directions, can be practiced easily, and therefore are committed to be shown in the figure. In a phase shift portion or unit (2111), the phase of this data of high-density is shifted by a predetermined amount thereof. In this instance, a horizontal phase shifter (2106) conducts phase shifting into the horizontal direction, and a vertical phase shifter (2107) conducts phase shifting into the vertical direction; i.e., they can be practiced in the similar manner to the retarders (105) and (107) and the π/2 phase shifter (108), which are shown in FIG. 1, and the operations/structures shown in FIGS. 7 and 8, and therefore are committed to be shown in the figure. For each signal, which is shifted in the phase thereof, the aliasing components in the horizontal/vertical directions are removed, respectively, in a horizontal directionaliasing component removal portion or unit (2108) and a vertical direction aliasing component removal portion or unit (2109) within an aliasing component removal portion or unit (2112). Next, an output of the horizontal direction aliasing component removal unit (2108) is interpolated in the pixels thereof with using a pixel interpolator (2003), to be the SR (horizontal) signal, while an output of the vertical direction aliasing component removal unit (2109) is interpolated in the pixels thereof with using a pixel interpolator (2007), to be the SR (vertical) signal, and both of those are combined in a mixer (2009) to be outputted. As the aliasing component removal units (2108) and (2109) can be applied the aliasing component removal unit (117) shown in FIG. 1, as it is in the structures thereof. Assuming that the phase difference is "θ" (102), it is possible to remove the aliasing components in the respective directions, by conducting the operations shown in FIG. 9, with using the horizontal phase difference "θH" (2102) in the aliasing component removal unit (2108), while using the vertical phase difference "θV" (2103) in the aliasing component removal unit (2109).

Figure 22:
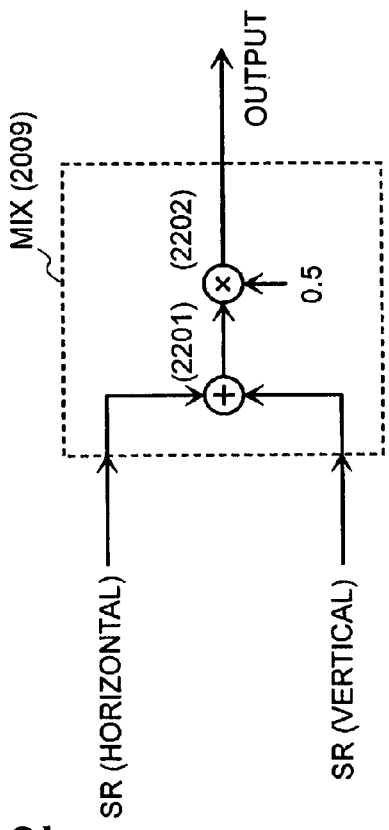
FIG. 22 is a view for explaining the eighth and the ninth embodiments, according to the present invention.

FIG. 22 shows a first example of structures of the mixer (2009). In the same figure, with using an adder (2201) and a multiplier (2201), an averaged value of each one of the signals, i.e., the SR (horizontal) signal and the SR (vertical) signal, which are inputted into the mixer (2009). The structure shown in the same figure is the simplest one of the mixer (2009), but an effect for improving each of resolutions, i.e., the horizontal/vertical directions, comes down to ½, respectively.

Figure 23:
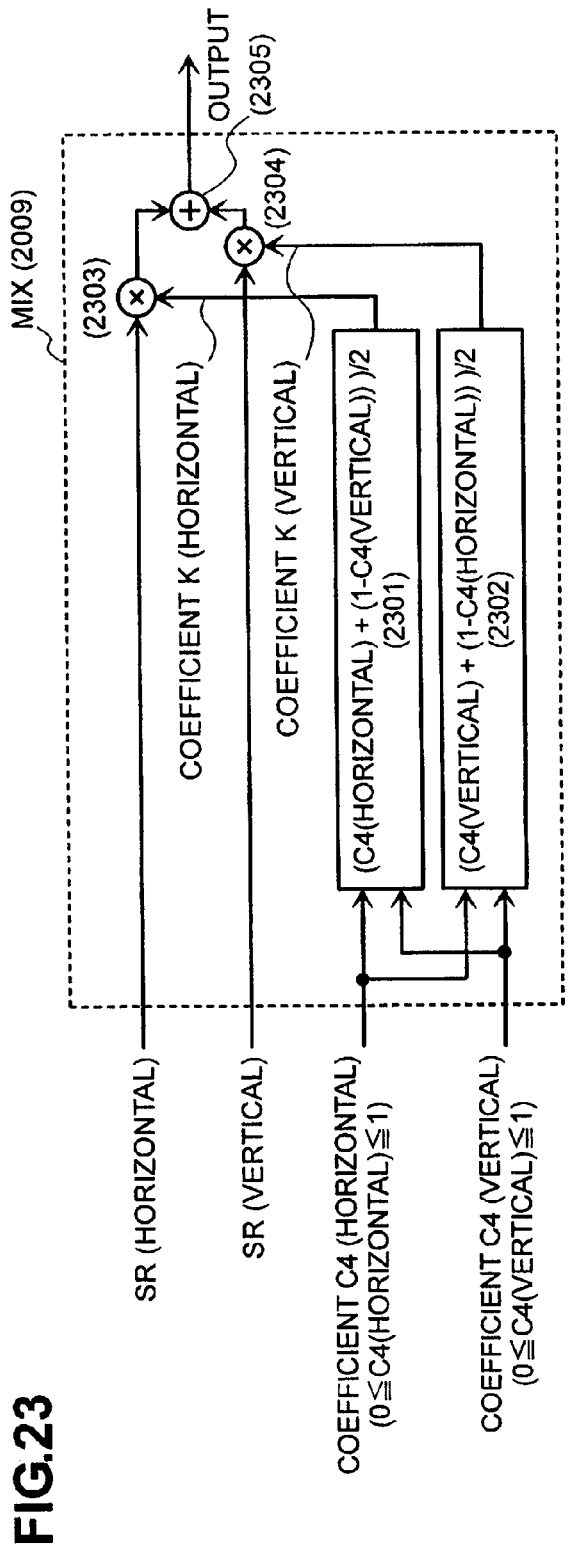
FIG. 23 is a view for explaining the eighth and the ninth embodiments, according to the present invention.

FIG. 23 shows a second example of structures of the mixer (2009). In the same figure, a coefficient "K" (horizontal) and a coefficient "K" (vertical) are multiplied upon the SR (horizontal) signal and the SR (vertical) signal, respectively, with using multipliers (2303) and (2304), and both are added in an adder (2305), to be outputted. The coefficient "K" (horizontal) and the coefficient "K" (vertical) are produced in coefficient determining portions or units (2301) and (2302), respectively. Hereinafter, explanation will be made on the operations of those coefficient determining units (2301) and (2302).

The aliasing component removal units (2108) and (2109) shown in FIG. 21 generate the coefficients C0-C3, which are shown in FIG. 9, in the coefficient determining unit (109) shown in FIG. 1, thereby conducting calculations for removing the aliasing components. In this instance, for the purpose of prevention from becoming weak in noises or the like, due to the fact that the coefficients C1 and C3 comes to be unstable when "θH" (2102) and "θV" (2103) are zero (0), or due to the fact that the coefficients C1 and C3 comes to be large when "θH" (2102) and "θV" (2103) come close to zero (0), it is preferable to introduce the coefficient C4 ($0 \leq C4 \leq 1$) shown in FIG. 13, thereby conducting an auxiliary pixel interpolation, as the structures shown in FIG. 11. Paradoxically speaking, there can be obtained the effect of improving the resolution when the value of coefficient C4 is 0.0, but that effect of improving the resolution comes to be small as the value of coefficient C4 comes close to 1.0. With using this characteristic, the coefficient "K" (horizontal) and the coefficient "K" (vertical) are determined with using the values of the respective coefficients in the horizontal/vertical directions, so that the SR (vertical) as the result of the vertical resolution conversion can be influenced, strongly, when the horizontal phase difference "θH" (2102) is in the vicinity of zero (0) (i.e., the coefficient C4 (horizontal) is in the vicinity of zero (0)) while the SR (horizontal) as the result of the horizontal resolution conversion can be influenced, strongly, when the vertical phase difference "θV" (2103) is in the vicinity of zero (0) (i.e., the coefficient C4 (vertical) is in the vicinity of zero (0)). For achieving this operation, for example, a calculation is done, K (horizontal)=C4 (horizontal)+(1-4C (vertical))/2, in the coefficient determining unit (2301) shown in FIG. 23, to determine K (horizontal), and a calculation is done, K (vertical)=C4 (vertical)+(1-4C (horizontal))/2, in the coefficient determining unit (2303), to determine K (vertical).

Figures 24, 25:
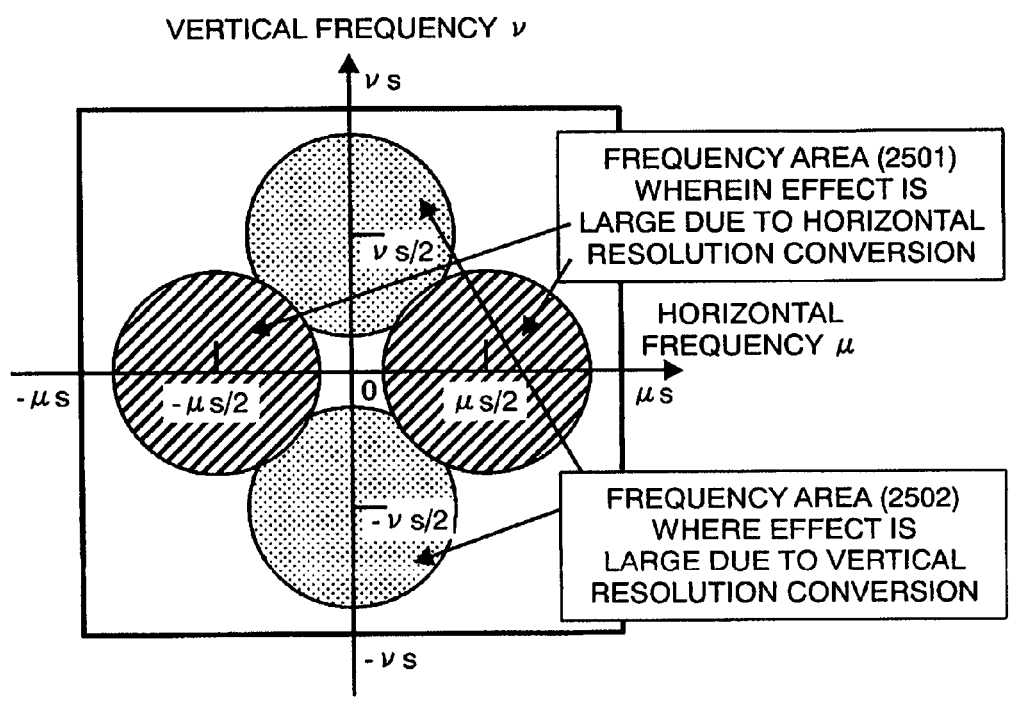
FIG. 24 is a view for explaining the eighth and the ninth embodiments, according to the present invention.
FIG. 25 is a view for explaining the eighth and the ninth embodiments, according to the present invention.

FIG. 24 shows examples of the outputs (coefficient K (horizontal) and the coefficient C4 (vertical)), collectively, of the coefficient determining units (2301) and (2302), when changing the coefficients C4 (horizontal) and C4 (vertical), respectively. As is shown in the same figure, it operates in such that, when the coefficient C4 (horizontal) comes to be large, the coefficient K (horizontal) comes to be small and at the same time the coefficient K (vertical) comes to be large, on the other hand when the coefficient C4 (vertical) comes to be large, then the coefficient K (horizontal) comes to be large and at the same time the coefficient K (vertical) comes to be small. When the coefficient C4 is equal to the coefficient C4 (vertical), the coefficient K (horizontal) and the coefficient (vertical) come to be 0.5, respectively. For the coefficients C4 changing horizontally/vertically, independently, in this manner, the coefficient K is so determined that, addition of the coefficient K (horizontal) and the coefficient K (vertical) comes to be just 1.0, to combine the SR (horizontal) and the SR (vertical).

Explanation will be made on examples of a third operation and the structural example of the mixer (2009), by referring to FIGS. 25 and 26, respectively. FIG. 25 shows a two-dimensional frequency region of showing the horizontal frequency by "μ" and the vertical frequency "v", respectively. Assuming that the horizontal sampling frequency of an original input picture is "μs" and the vertical sampling frequency thereof is "vs", then an output of the resolution converting unit (4) shown in FIGS. 20 and 21 comes to be a signal, within a region from "−μs" to "+μs" in the horizontal frequency "μ", and within a region from "−vs" to "+vs" in the vertical frequency "v". Thought the high-frequency components come to be reproduced through each of the horizontal/vertical resolution conversions, but since the high-frequency components are small on the signal level, inherently, then it is the component of a frequency region (2501) in the vicinity of (μ, v)= (±μs/2, 0), upon which the effect due to the horizontal resolution conversion is large (in particular, the components of regions of the frequency, including (μ, v)=(+μs/2, 0), a region of frequency μ>0, and (μ, v)=(−μs/2, 0), a region of frequency μ<0), and it is the component of a frequency region (2502) in the vicinity of (μ, v)=(0, ±vs/2), upon which the effect due to the vertical resolution conversion is large (in particular, the components of the regions of frequency, including (μ, v)=(0, +vs/2), a region of frequency v>0, and (μ, v)=(0, −vs/2), a region of frequency v<0). Accordingly, by extracting those frequency components (2501) and (2502) through the 2-dimensional filter, to be mixed up, it is possible to output the components, upon which the effect is large of improving the resolution, selectively.

Figure 26:
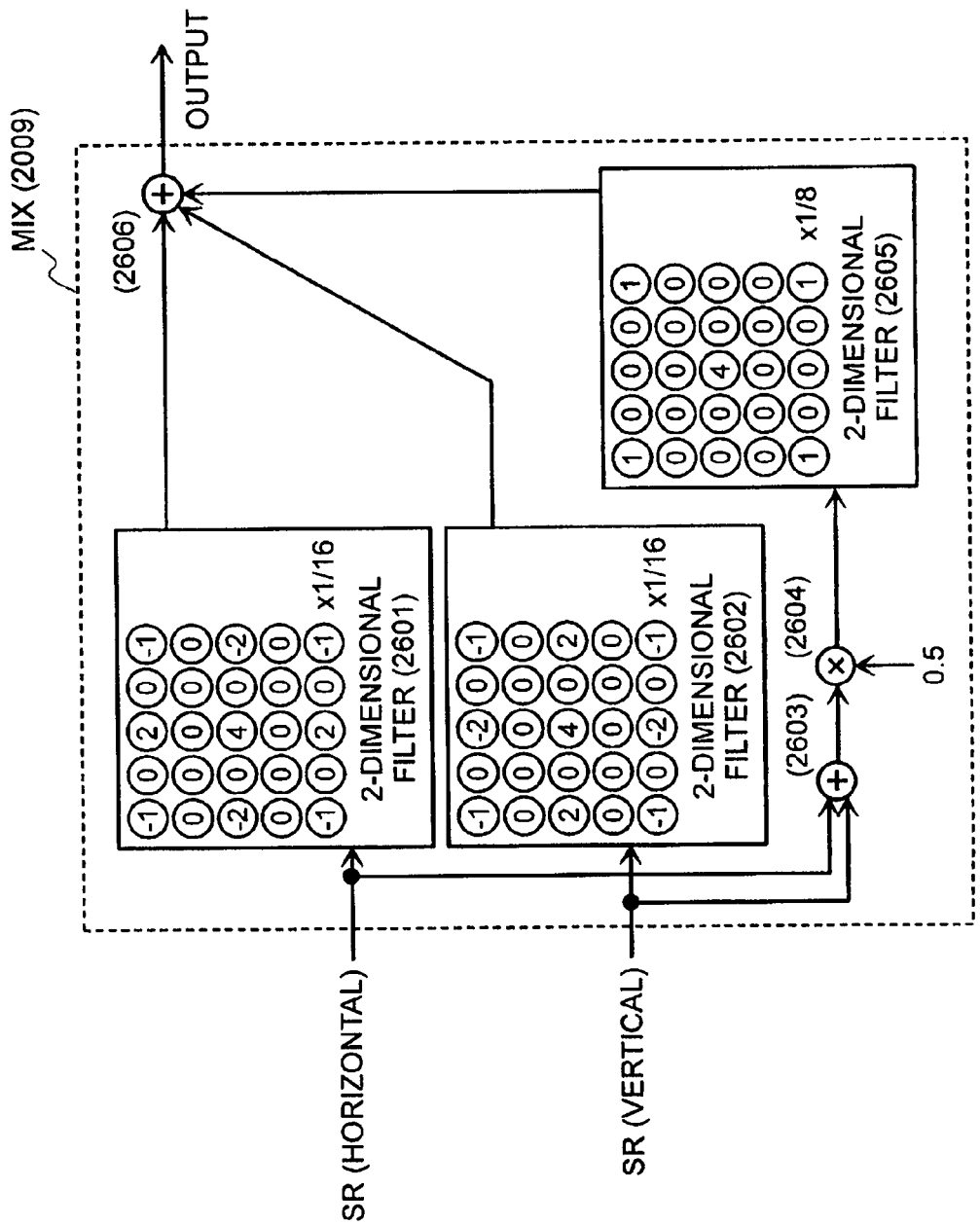
FIG. 26 is a view for explaining the eighth and the ninth embodiments, according to the present invention.

FIG. 26 shows the structural example of the mixer (2009) for extracting the components, upon each of which the effect due to the horizontal/vertical resolution conversion is large. In the same figure, with using a 2-dimensional filter (2601), a component is extracted of the frequency region (2501), which has a large effect of improving the resolution upon the SR (horizontal) inputted into the mixer (2009). In the similar manner, with using a 2-dimensional filter (2602), a component is extracted of the frequency region (2502), which has a large effect of improving the resolution upon the SR (vertical) inputted into the mixer (2009). As a component other than the frequency regions (2501) and (2502), a signal is produced of an average between the SR (horizontal) and the SR (vertical) with using an adder (2603) and a multiplier (2604), and components other than the respective pass bands of the 2-dimensional filters (2601) and (2602) (i.e., remaining components) are extracted with using a 2-dimensional filter (2605). Each output signal of the 2-dimensional filters (2601), (2602) and (2605) is added within an adder (2606), to be an output of the mixer (2009). However, a numeral, which is surrounded by a circle, among the 2-dimensional filters (2601), (2602) and (2605) shown in the same figure, shows an example of tap coefficient of the filter, respectively. (The coefficient of each of the filters is inscribed by an integer, for the purpose of simplifying the explanation thereof. The inherent or original value of the coefficient is calculation of the figure surrounded by a circle and "×1/16", etc., which is shown at the right-hand side thereof, i.e., the production. For example, in the 2-dimensional filters (2601), the inherent coefficient value is multiplying "1/16" on each of the figures, which are surrounded by the circles therein. This is same to the coefficients of the 2-dimensional filters, which will be shown in the following embodiments.) It is enough that the 2-dimensional filters (2601) be a production of a horizontal band pass filter and a vertical band pass filter applying ±μs/2 to be a central frequency of the pass band, while the 2-dimensional filters (2602) be a production of a vertical band pass filter and a horizontal band pass filter applying ±vs/2 to be a central frequency of the pass band, and the 2-dimensional filters (2605) may be in characteristic obtained by subtracting the pass bands of the 2-dimensional filters (2601) and the 2-dimensional filters (2602) from all bands.

Embodiment 10

FIG. 27 shows the video signal processing apparatus, according to a tenth embodiment of the present invention. The video signal processing apparatus according to the present embodiment has the structures of adding the high-resolution converting units for the lower right and the upper right oblique components, in addition to an example of the structures shown in FIG. 21. Thus, an oblique (the lower right) phase shift portion or unit (2701) and an oblique (the upper right) phase shift portion or unit (2702) are added to a phase shift portion or unit (2708), and aliasing component removal portions (2705) and (2706) are added to an aliasing component removal portion or unit (2709), wherein after passing through pixel interpolators (2710) and (2711), respectively, each of the signals, SR (horizontal), SR (vertical), SR (upper right) and SR (lower right), is mixed within a mixer portion or unit (2707), so as to obtain an output. Herein, as the pixel interpolator (2710) or (2711) may be applied a general 2-dimensional filter, for outputting an averaged value of the pixel data on the upper and the lower sides and the left and the right sides of pixel to be interpolated. As the phase difference "0" is needed the phase difference information in the oblique direction, and therefore, the following structures may be made: i.e., the phase difference (θH+θV) obtained by adding the horizontal phase difference "θH" (2102) and the vertical phase difference "θV" (2103) in an adder (2703) is inputted into the aliasing component removal unit (2705), while the phase difference (−θH+θV) produced in a subtractor (2704) is inputted into the aliasing component removal unit (2706). However, the structures and the operations of all the aliasing component removal units (2106), (2109), (2705) and (2706) are common.

Figure 28A:
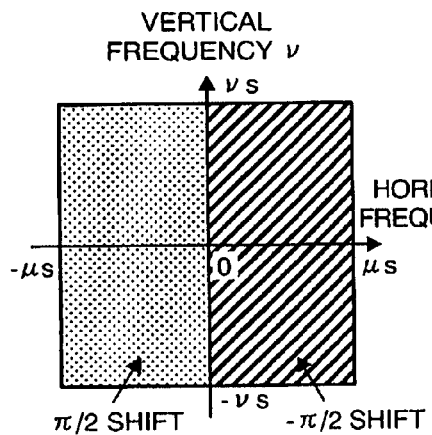
FIGS. 28(a) to 28(d) are views for explaining the tenth embodiment, according to the present invention.
Figure 28B:
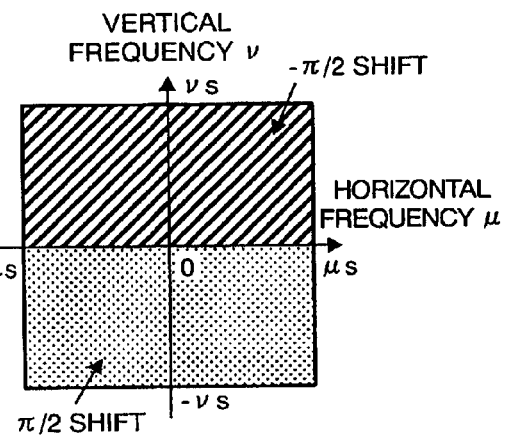
Figure 28C:
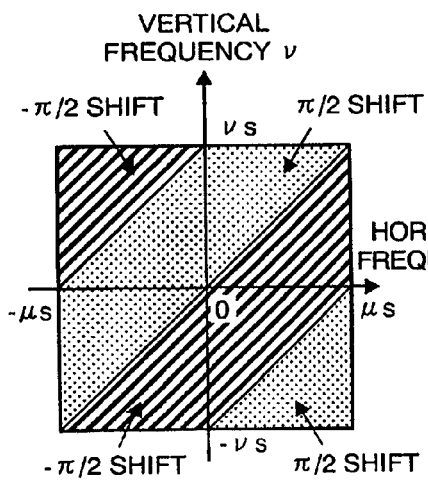
Figure 28D:
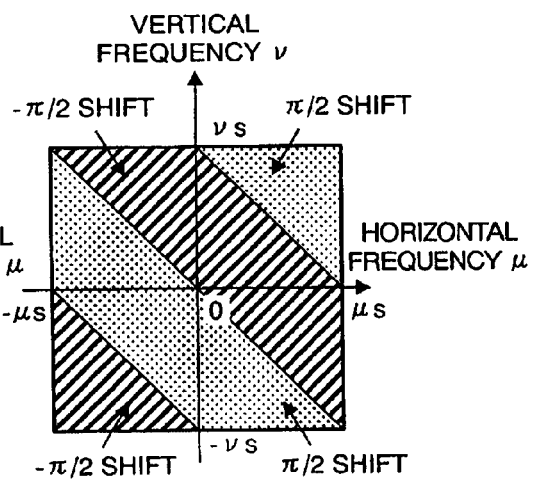

FIGS. 28(a) to 28(d) show the operations of the horizontal phase shift unit (2106), the vertical phase shift unit (2107), the oblique (lower right) phase shift unit (2101) and the oblique (upper right) phase shift unit (2102), in the 2-dimensional frequency region, respectively. FIGS. 28(a) to 28(d) show the 2-dimensional frequency region, while showing the horizontal frequency by "μ" and the vertical frequency "ν", in the similar manner to those shown in FIG. 25. Those phase shift units (2106), (2107), (2701) and (2702) have the same structure of the phase shift unit (116) shown in FIG. 1, wherein "frequency-phase difference" characteristics of the π/2 phase shifters (106) and (108) in those are changed fitting to the respective directions thereof. Thus, in FIG. 28(a), the horizontal phase shift unit (2106) shifts the phase of frequency components within a region from −μs to 0 by only π/2, and also shifts the phase of frequency components within a region from 0 to μs by only −π/2, in the similar manner to the operation shown in FIG. 7, in case when the horizontal frequency sampling frequency for the input signal is μs. In the similar manner, the vertical phase shift unit (2107) shifts the phase of frequency components within a region from −vs to 0 by only π/2, and also shifts the phase of frequency components within a region from 0 to vs by only −π/2, in case when the vertical frequency sampling frequency for the input signal is vs. In the similar manner, the oblique (lower right) phase shift unit (2101) and the oblique (upper right) phase shift unit (2102) shift the phase of the signal by only π/2 or −π/2, as is shown in FIG. 28(c) and FIG. 28(d), respectively. Those "frequency-phase difference" characteristics can be achieved, easily, through disposing the tap coefficients shown in FIG. 8 into the respective directions, the horizontal direction, the vertical direction, the oblique (lower right) direction and the oblique (upper right) direction, fitting to the points of the 2-dimensional sampling.

Figure 29:
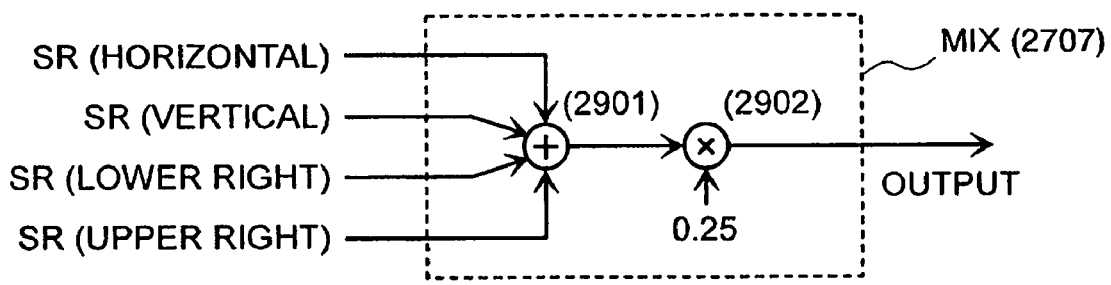
FIG. 29 is a view for explaining the tenth embodiment, according to the present invention.

FIG. 29 shows a first example of the structures of the mixer (2707). In the same figure, with using an adder (2901) and a multiplier (2902) is produced an averaged value for each of the signals, SR (horizontal), SR (vertical), SR (lower right) and SR (upper right), to be outputted. The structure shown in the same figure is an example of constructing the mixer (2707) in the easiest manner, but the effect of improving the resolution also comes down to ¼ for each direction, horizontal, vertical, lower right and upper right.

Figure 30:
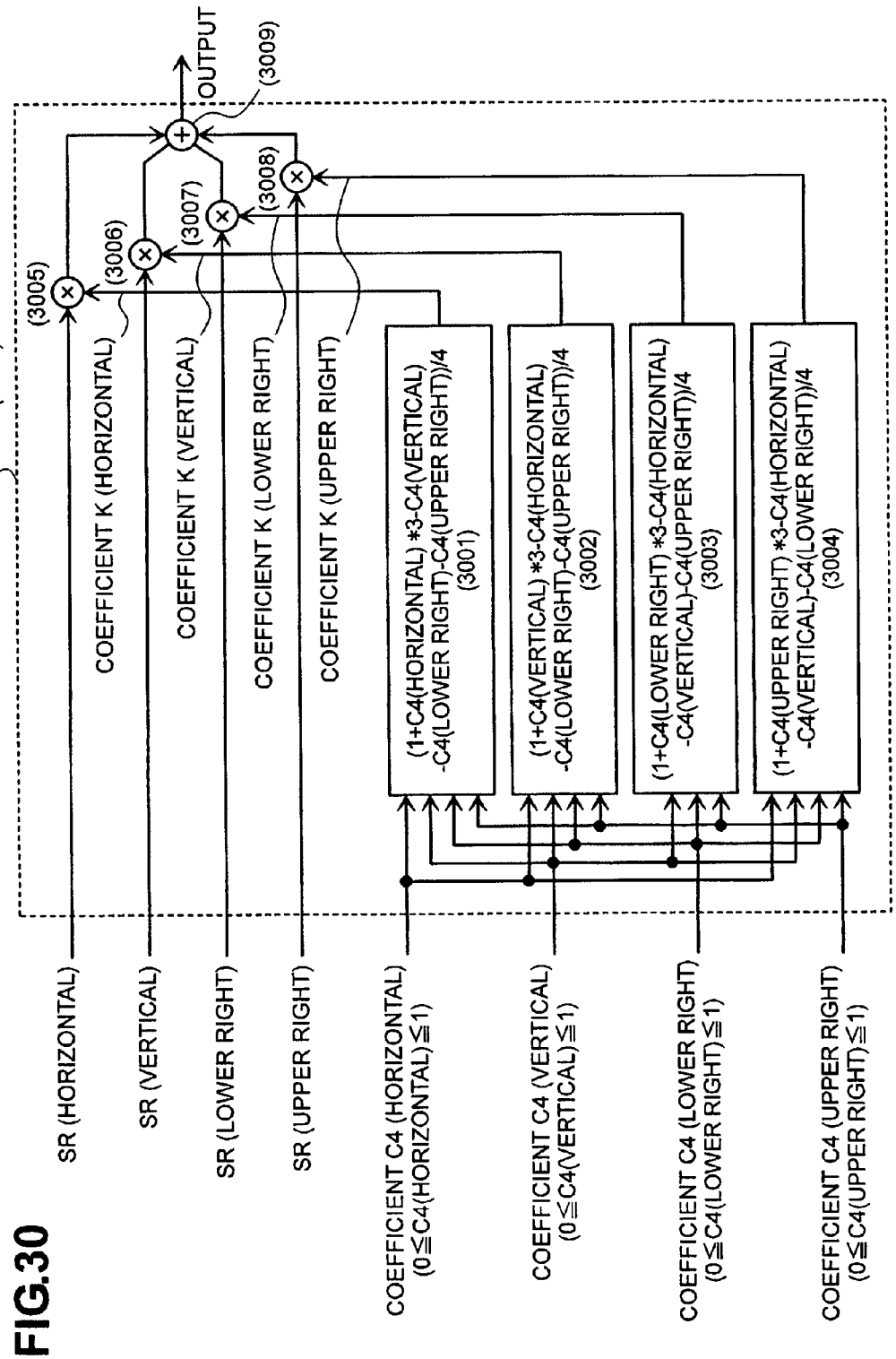
FIG. 30 is a view for explaining the tenth embodiment, according to the present invention.

FIG. 30 shows a second example of the structures of the mixer (2707). In the same figure, the coefficient K (horizontal), the coefficient K (vertical), the coefficient K (lower right) and the coefficient K (upper right) are multiplied upon the signals, SR (horizontal), SR (vertical), SR (upper right) and SR (lower right), which are inputted into the mixer (2707), with using multipliers (3005), (3006), (3007) and (3008), respectively, and those signals are added in an adder (3009) to be outputted. The coefficient K (horizontal), the coefficient K (vertical), the coefficient K (lower right) and the coefficient K (upper right) are produced in coefficient determining units (3001), (3002), (3003) and (3004), respectively. Hereinafter, explanation will be made on the operations of those coefficient determining units (3001), (3002), (3003) and (3004). The aliasing component removal units (2106), (2109), (2705) and (2706) shown in FIG. 27 generate the coefficients C0-C3 shown in FIG. 9, within the coefficient determining unit (109) shown in FIG. 1, upon basis of the phase difference "θH" (2102), the phase difference "θV" (2103), the phase difference "θH+θV" and the phase difference "−θH+θV", and thereby conducting the calculation for removing the aliasing components. In this instance, for the propose of prevention from becoming weak in noises or the like, due to the fact that the coefficients C1 and C3 comes to be unstable when "θH" (2102), "θV" (2103), "θH+θV" and "−θH+θV" are zero (0), or due to the fact that the coefficients C1 and C3 comes to be large when "θH" (2102), "θV" (2103), "θH+θV" and "−θH+θV" come close to zero (0), it is preferable to introduce the coefficient C4 (0≦C4≦1) shown in FIG. 13, thereby conducting an auxiliary pixel interpolation, as the structures shown in FIG. 11. Paradoxically speaking, there can be obtained the effect of improving the resolution when the value of coefficient C4 is 0.0, but that effect of improving the resolution comes to be small as the value of coefficient C4 comes close to 1.0. With using this characteristic, the coefficient "K" (horizontal) is determined within the coefficient determining unit (3001), so that the RS (horizontal) as the result of the horizontal resolution conversion comes to be weak, when the horizontal phase difference "θH" (2102) is in the vicinity of zero (0) (i.e., when the coefficient C4 (horizontal) is in the vicinity of 1.0), while the SR (horizontal) as the result of the horizontal resolution conversion comes to be strong, when the horizontal phase difference "θH" (2102) is not in the vicinity of zero (0) (i.e., when the coefficient C4 (horizontal) is in the vicinity of 0.0). As an example of this, it is enough to make an equation, coefficient K (horizontal)= (1+C4 (horizontal)*3-C4 (vertical)-C4 (lower right)-4C (upper right))/4. In the similar manner, the coefficients K (vertical), K (lower right) and K (upper right) are determined within the coefficient determining units (3002), (3003) and (3004), respectively. In this instance, the coefficient K (upper right) is determined so as to satisfy; coefficient K (horizontal)+coefficient K (vertical)+coefficient K (lower right)+coefficient K (upper right)=1.0, for the coefficient K (horizontal), the coefficient K (vertical), the coefficient K (lower right) and the coefficient K (upper right), and SR (horizontal), SR (vertical), SR (lower right) and SR (upper right) are mixed.

Figure 31:
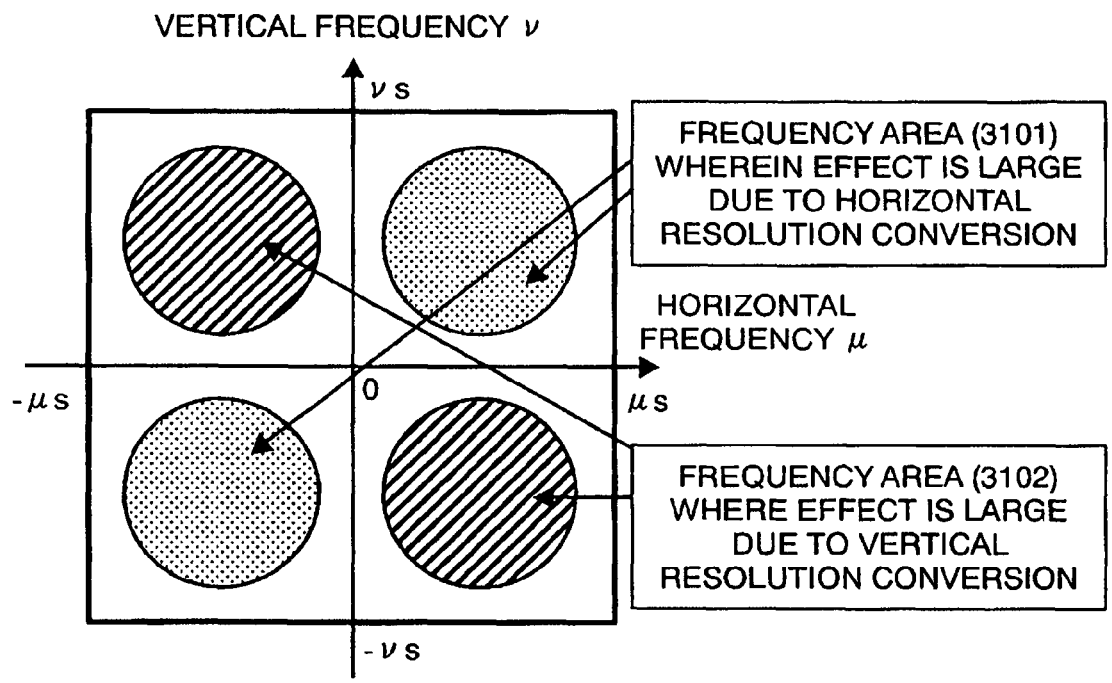
FIG. 31 is a view for explaining the tenth embodiment, according to the present invention.
Figure 32:
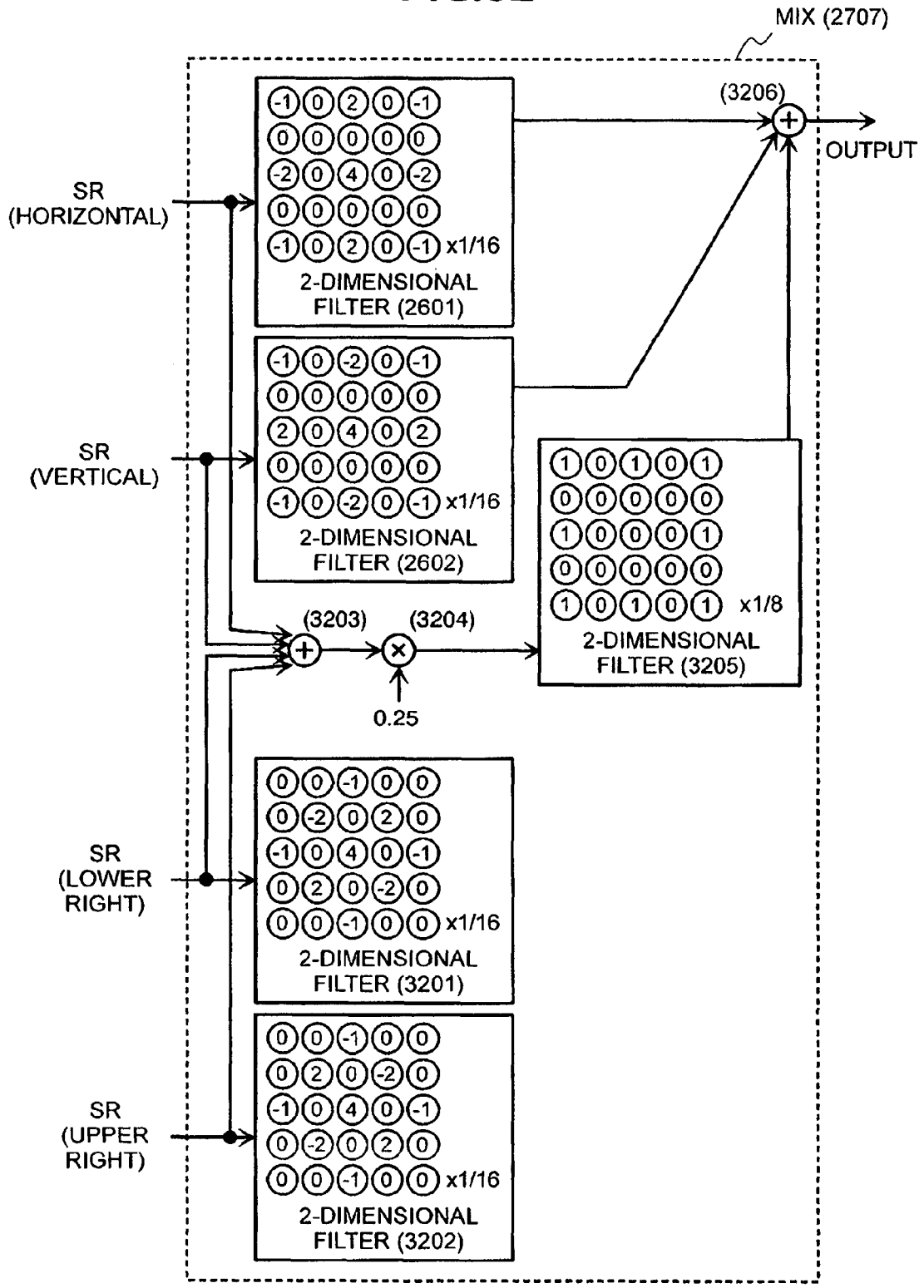
FIG. 32 is a view for explaining the tenth embodiment, according to the present invention.

FIGS. 31 and 32 shows a third operation and an example of the structures of the mixer (2707), respectively. FIG. 31 shows the 2-dimensional frequency region of showing the horizontal frequency by "μ" and the vertical frequency by "ν", in the similar manner to that shown in FIG. 25. In FIG. 31, assuming that the horizontal sampling frequency of the original input picture is "μs" and that the vertical sampling frequency thereof is "vs", then an output of the resolution converting unit (4) shown in FIG. 27 comes to be a signal, within a region from "−μs" to "+μs" in the horizontal frequency "μ", and within a region from "−vs" to "+vs" in the vertical frequency "ν". The component, upon which the effect due to the horizontal resolution conversion is large, is the component of the frequency regions in the vicinity of (μ, ν)=(+μs/2, +vs/2) and in the vicinity of (μ, ν)=(−μs/2, −vs/2), as shown in FIG. 31 (in particular, the components in the region of frequency μ>0, ν>0, including (μ, ν)=(+μs/2, +vs/ 2), and the region of frequency μ<0, ν<0, including (μ, ν)=(− μs/2, vs/2)). The component, upon which the effect due to the oblique (lower right) resolution conversion is large, is the component of the frequency regions in the vicinity of (μ, ν)=(+μ/2, −vs/2) and in the vicinity of (μ, ν)=(−μs/2, +vs/2)

(in particular, the components in the region of frequency μ>0, ν<0, including (μ, ν)=(+μs/2, −νs/2), and the region of frequency μ<0, ν>0, including (μ, ν)=(−μs/2, +νs/2)). Accordingly, by extracting those frequency components (3101) and (3102) through the 2-dimensional filter, to be mixed up with the frequency components (2501) and (2502), it is possible to output the components, upon which the effect is large of improving the resolution, selectively.

FIG. 32 shows an example of the structures of the mixer (2707) for extracting the components, upon each of which the effect is large due to the horizontal/vertical/oblique (lower right)/oblique (upper right) resolution conversions. In the same figure, with using a 2-dimensional filter (3201), a component is extracted of the frequency region (3102), which has a large effect of improving the resolution upon the SR (lower right) inputted into the mixer (2707). In the similar manner, with using a 2-dimensional filter (3202), a component is extracted of the frequency region (2502), which has a large effect of improving the resolution upon the SR (upper right) inputted into the mixer (2707). Also, by means of the 2-dimensional filters (2601) and (2602) shown in FIG. 26, the components are extracted of the frequency regions, having large effects of improving the resolutions upon the SR (horizontal) and the SR (vertical), respectively. As a component other than the frequency regions (2501), (2502), (3101) and (3102), an averaged signal of the SR (horizontal), the SR (vertical), the SR (lower right) and the SR (upper right) is produced with using an adder (3203) and a multiplier (3204), and with using a 2-dimensional filter (3205), there is extracted a component other than the respective pass bands of the 2-dimensional filters (2601), (2602), (3201) and (3202). Each output signal of the 2-dimensional filters (2601), (2602), (3201) and (3202) is added within the adder (3206), to be an output of the mixer (2707).

However, a numeral, which is surrounded by a circle among the 2-dimensional filters (2601), (2602), (3202), (3203) and (3205) shown in the same figure, shows an examples of tap coefficient of the filter, respectively.

Embodiment 11

Figure 33:
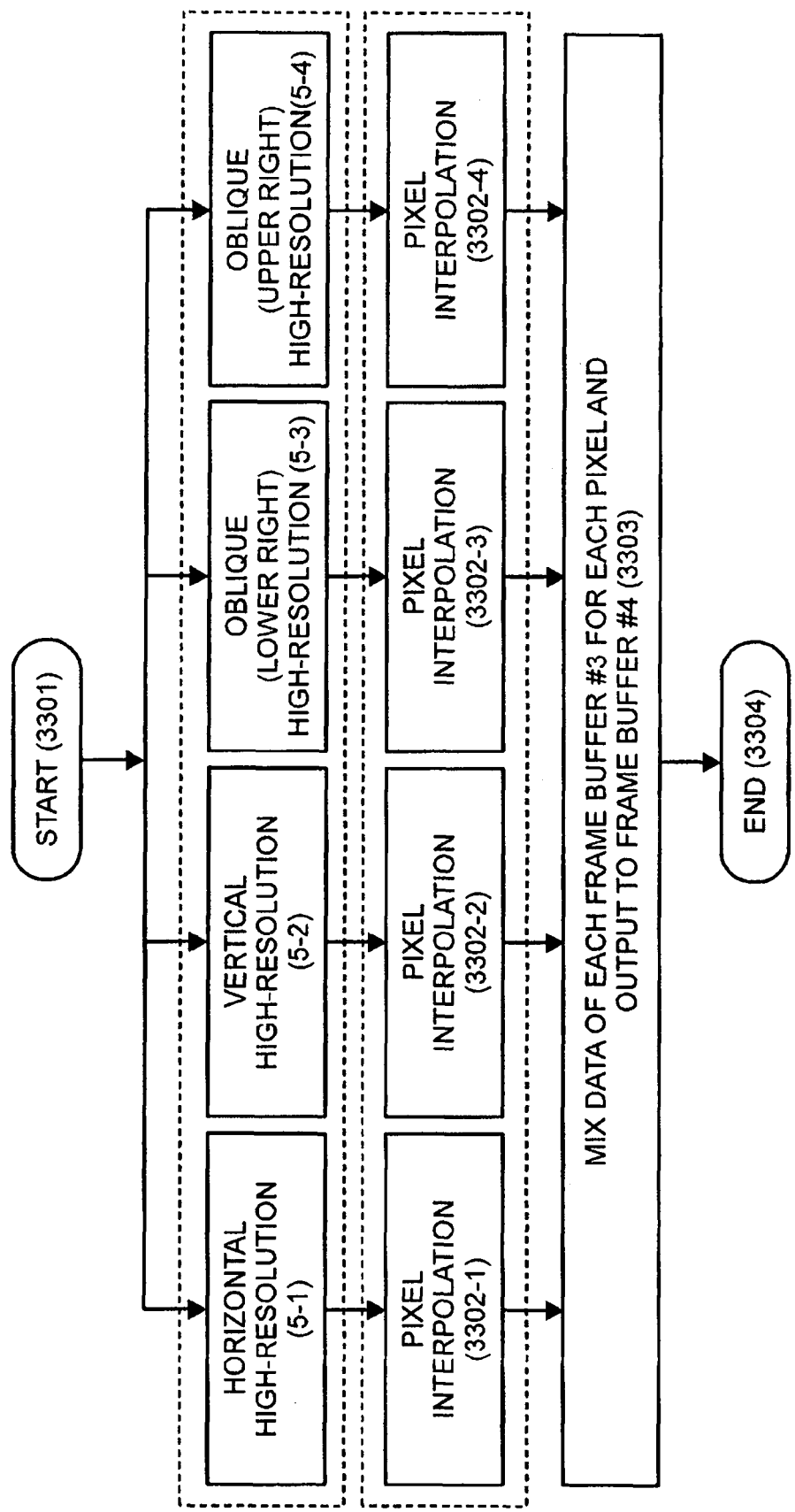
FIG. 33 is a view for explaining an eleventh embodiment, according to the present invention.

FIG. 33 shows an eleventh embodiment according to the present invention. In the same figure, it is an example of achieving the operation of the tenth embodiment mentioned above, by means of a software program. In the same figure, the process starts from a step (3301), and conducts the horizontal, the vertical, the oblique (lower right) and the oblique (upper right) high-resolution conversions in steps (5-1), (5-2), (5-3) and (5-4), respectively. Herein, in each of the steps (5-1), (5-2), (5-3) and (5-4), it is enough to execute any one of the processing steps (5), which are shown in any of FIGS. 14 to 16, in each of the directions, i.e., the horizontal, the vertical, the oblique (lower right) and the oblique (upper right) directions. Thus, it is enough to change the "frequency-phase" characteristics, such as, the π/2 phase shift (1407) and (1408) and the Hilbert transformer (1501), etc., corresponding to the respective directions, as is shown in FIG. 28, and also to process by replacing the phase difference "0" with "θH", "(θH+θV)" and "(−θH+θV)", respectively. A result of each of the steps (5-1), (5-2), (5-3) and (5-4), as was explained by using any one of FIGS. 14 to 16, is written into the respective frame buffers #3. In the following steps (3302-1), (3302-2), (3302-3) and (3302-4), all pixels of the 2-dimensional frame buffers #3 are produces by conducting the pixel interpolations in the vertical, the horizontal and the oblique directions, respectively, so that the number of pixels comes to the same pixel number in the horizontal/vertical directions of the frame to be outputted. In the following step (3303), the data of each of the frame buffers #3 are mixed, for each pixel, in accordance with the method explained by referring to FIGS. 29, 30 and 32, to be outputted to an output frame buffer #4. However, in case when achieving the operations of the eighth or the ninth embodiment mentioned above by means of a software program, there is no necessity of the steps (5-3) and (5-4) for conducting the process in the oblique direction, and the steps for conduction the pixel interpolation for the results thereof (3302-3) and (3302-4). Also, as the mixing method of the step (3303), it is enough to mix the data in accordance with the method, which is explained by referring to FIGS. 22, 23 and 26. With the mixing method in this step (3303), an illustration thereof is omitted herein, since it can be practiced, easily, upon basis of the explanation of operations mentioned above.

Embodiment 12

FIG. 35 shows a video display apparatus, according to a twelfth embodiment of the present invention. The video display apparatus according to the present embodiment is that of the structures, for conducting the video signal processing, which is described in any one of the first to the eleventh embodiments mentioned above.

In the same figure, the video display apparatus 3500 comprises an input unit 3501 for inputting the broadcast wave, including a television signal or the like, for example, and/or the broadcast signal or the picture contents or the video contents, etc., through a network, etc., a recording/reproduction portion or unit 3502 for recording or reproducing the contents, which are inputted from the input unit 3501, a contents accumulator portion or unit 3503, into which the recording/reproduction unit 3502 records the contents, a video signal processor portion or unit 3504 for conducting video signal processing, which is described in any one of the embodiments, i.e., the first to the eleventh embodiments, upon the picture signal or the video signal that the recording/reproduction unit 3502 reproduces, a display portion or unit 3505 for displaying the picture signal or the video signal thereon, which is processed within the video signal processor unit 3504, an audio output portion or unit 3506 for outputting an audio signal, which the recording/reproduction unit 3502 reproduces, a controller portion or unit 3507 for controlling the respective units of the video display apparatus 3500, and a user interface portion or unit 3508 for a user to conduct operations of the video display apparatus 3500, etc.

With provision of the video signal processor unit 3504 for conducting the video signal process, which is described in any one of the embodiments, the first to the eleventh embodiments, in the video display apparatus 3500, it is possible to display the picture signal or the video signal, which is inputted into the input unit 3501, to be the picture signal or the video signal of being more high in the resolution and high-quality. Therefore, it is possible to achieve a display of high-quality and high-definition while achieving the high resolution of the reproduced signal, even in the case when a signal of resolution lower than the resolution of a display device of the display unit 3505 is inputted from the input unit 3501.

Also, when reproducing the picture contents or the video contents, which are accumulated in the contents accumulator unit 3503, it is possible to display it on the display unit 3505 by converting it into the picture signal or the video signal, which is high in the resolution and high in the quality thereof.

Also, by conducting the video processing of the video signal processor unit 3504 after reproduction of the picture contents or the video contents, which are accumulated in the contents accumulator unit 3503, the data accumulated within the contents accumulator unit 3503 is relatively low in the resolution, comparing to that resolution displayed on the display unit 3505. Therefore, there can be obtained an effect of accumulating the data of contents to be small in the volume thereof, relatively.

Also, with containing the video signal processor unit 3504 into the recording/reproducing unit 3502, it is possible to conduct the video signal processing mentioned above when recording. In this case, there is no necessity of conducting the video signal processing mentioned above when reproducing, there can be obtained an effect of lowering a process load when reproducing.

Herein, although the explanation was made that the video signal processing mentioned above is conducted within the video signal processor unit 3504, but it may be achieved by means of the controller unit 3507 and the software. In this case, it is enough to conduct the video signal processing with the method, which is described in any one of the embodiments, i.e., the first to the eleventh embodiments.

In the present embodiment, when recording, it is enough for the recording/reproducing unit 3502 to record the contents, such as, the picture or the like, which is inputted from the input unit 3501, into the contents accumulator unit 3503, after conducting the coding thereon, depending on the condition thereof.

Also, in the present embodiment, it is enough for the recording/reproducing unit 3502 to reproduce the contents, such as, the picture or the like, which is inputted from the input unit 3501, by conducting the decoding thereon, if the contents are under the condition of being coded.

Also, in the present embodiment, it is not always necessary to provide the contents accumulator unit 3503. In this case, the contents accumulator unit 3503 does not conduct the recording, but it may conduct reproduction of the contents, such as, the picture or the like, which is inputted from the input unit 3501.

In this case, it is also possible to obtain an effect of displaying the picture signal or the video signal, which is inputted into the input unit 3501, to be the high-quality picture signal or video signal, with higher resolution.

Also, the video display apparatus 3500 may be, for example, a plasma display, or a liquid crystal television, or a CRT tube or a projector, or it may be an apparatus applying other device therein. In the similar manner, the display unit 3505 may be, for example, a plasma display module, or a LCD module, or a device for use of the projector. Also, the contents accumulator unit 3503 may be, for example, a hard disk drive, or a flash memory, or a removable media disk drive. The audio output unit 3506 may be, for example, speakers, etc. Also, the input unit 3501 may be that having a tuner for receiving the broadcast wave, or that having a LAN connector for connecting with the network, or that having a USB connector. Further, it may be that having terminals for digital inputting of the picture signal and the audio signal, or may be that having analog input terminals, such as, composite terminals and/or component terminals, for example. Or, it may be a receiver portion or unit for transmitting data in a wireless manner.

Embodiment 13

Figure 36:
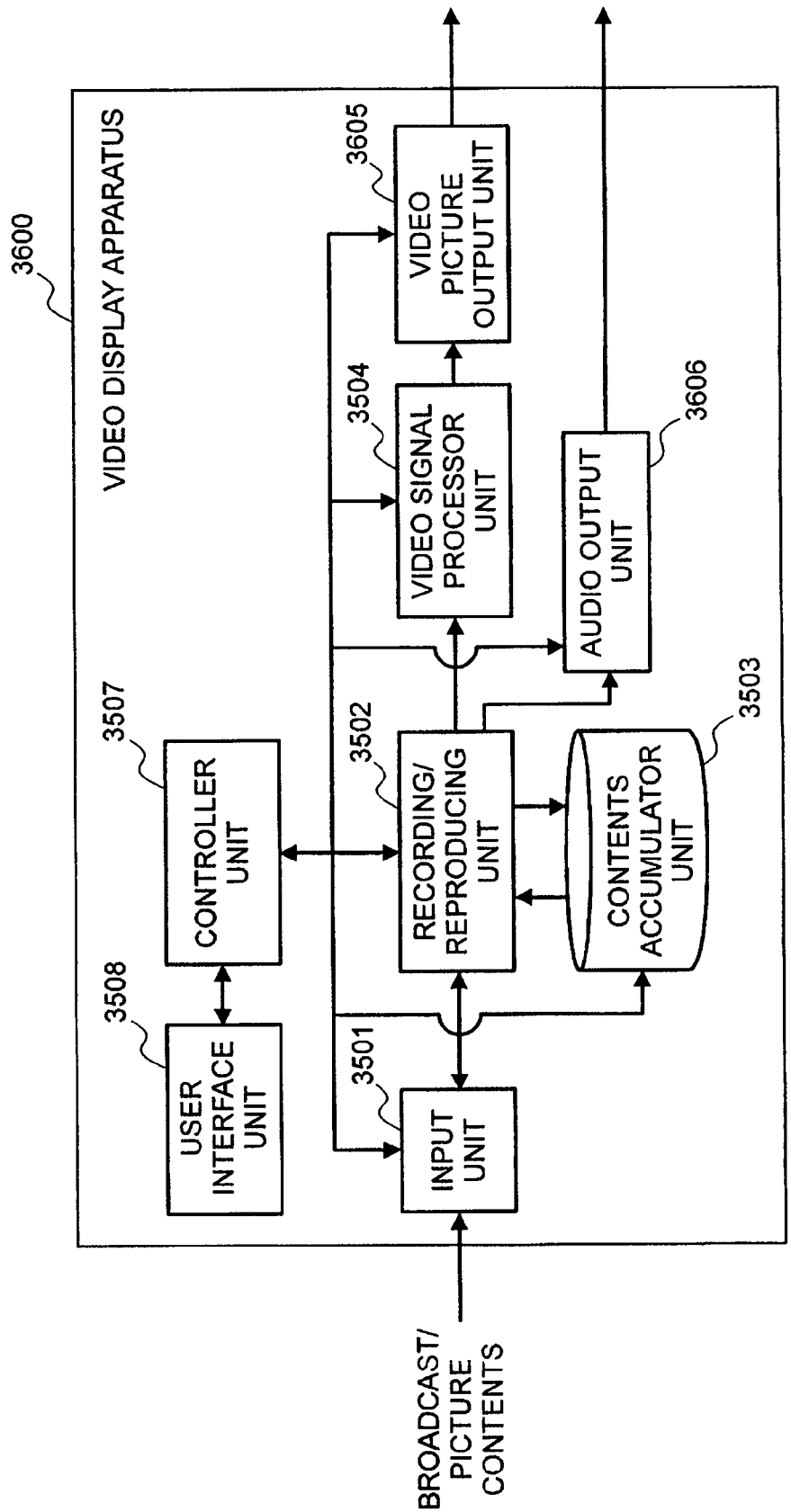
FIG. 36 is a view for explaining a thirteenth embodiment, according to the present invention.

FIG. 36 shows a recording/reproducing apparatus according to a thirteenth embodiment of the present invention. The recording/reproducing apparatus according to the present embodiment is that of the structures for conducing the video signal processing, which is described in any one of the embodiments, i.e., the first to the eleventh embodiments mentioned above.

In the same figure, the recording/reproducing apparatus 3600 comprises the an input portion or unit 3501 for inputting the broadcast wave, including a television signal or the like, for example, and/or the broadcast signal or the picture contents or the video contents, etc., through a network, etc., the recording/reproduction unit 3502 for recording or reproducing the contents, which are inputted from the input unit 3501, the contents accumulator unit 3503, into which the recording/reproduction unit 3502 records the contents, the video signal processor unit 3504 for conducting video signal processing, which is described in any one of the embodiments, i.e., the first to the eleventh embodiments, upon the picture signal or the video signal that the recording/reproduction unit 3502 reproduces, a video/picture output portion or unit 3605 for outputting the picture signal or the video signal, which is processed within the video signal processor unit 3504, to other apparatus(es) or device(s), etc., an audio output portion or unit 3606 for outputting the audio signal, which the recording/reproducing unit 3502 reproduces, to other apparatus(es) or device(s), etc., and a user interface portion or unit 3508 for a user to conduct operations of the recording/reproducing apparatus 3600, etc.

With provision of the video signal processor unit 3504 for conducting the video signal process, which is described in any one of the embodiments, the first to the eleventh embodiments, in the recording/reproducing apparatus 3600, it is possible to output the picture signal or the video signal, which is inputted into the input unit 3501, to be the picture signal or the video signal of being more high in the resolution and high-quality, to other apparatus(es) or device(s).

Therefore, it is possible to achieve a high-quality and high-resolution signal converter apparatus, preferably, for converting the picture signal or the video signal of low resolution into the picture signal or the video signal of high-quality and high-definition while achieving the high resolution thereof.

Also, when reproducing the picture contents or the video contents, which are accumulated in the contents accumulator unit 3503, it is possible to output it to other apparatus(es) or device(s), by converting it into the picture signal or the video signal, which is high in the resolution and high in the quality thereof.

Therefore, it is possible to achieve a preferable recording/reproducing apparatus, for outputting the picture signal or the video signal of high-quality and high-definition, being converted with high resolution when reproducing/Outputting, while inputting and accumulating the picture signal and the video signal of low resolution.

Also, by conducting the video processing of the video signal processor unit 3504 after reproduction of the picture contents or the video contents, which are accumulated in the contents accumulator unit 3503, the data accumulated within the contents accumulator unit 3503 is relatively low in the resolution, comparing to that resolution displayed on the display unit 3505. Therefore, there can be obtained an effect of accumulating the data of contents to be small in the volume thereof, relatively.

Also, with containing the video signal processor unit 3504 into the recording/reproducing unit 3502, it is possible to conduct the video signal processing mentioned above when recording. In this case, there is no necessity of conducting the video signal processing mentioned above when reproducing, there can be obtained an effect of lowering a process load when reproducing.

Herein, although the explanation was made that the video signal processing mentioned above is conducted within the video signal processor unit 3504, but it may be achieved by means of the controller unit 3507 and the software. In this case, it is enough to conduct the video signal processing with the method, which is described in any one of the embodiments, i.e., the first to the eleventh embodiments.

In the present embodiment, when recording, it is enough for the recording/reproducing unit 3502 to record the contents, such as, the picture or the like, which is inputted from the input unit 3501, into the contents accumulator unit 3503, after conducting the coding thereon, depending on the condition thereof.

Also, in the present embodiment, it is enough for the recording/reproducing unit 3502 to reproduce the contents, such as, the picture or the like, which is inputted from the input unit 3501, by conducting the decoding thereon, if the contents are under the condition of being coded.

Also, the video/picture output unit 3605 according to the present embodiment may be formed with the audio output unit 3606 in one body. In this case, there may be applied a connector configuration for outputting the picture signal and the audio signal on one piece of a cable.

Also, the recording/reproducing apparatus 3600 may be, for example, a HDD recorder, a DVD recorder, or an apparatus adapting other memory apparatus therein. In the similar manner, the contents accumulator unit 3503 may be, for example, a hard disk drive, or a flash memory, or a removable media disk drive.

Also, the input unit 3501 may be that having a tuner for receiving the broadcast wave, or that having a LAN connector for connecting with the network, or that having a USB connector. Further, it may be that having terminals for digital inputting of the picture signal and the audio signal, or may be that having analog input terminals, such as, composite terminals and/or component terminals, for example. Or, it may be a receiver portion or unit for transmitting data in a wireless manner.

Also, the video/picture output unit 3605 may be equipped with a terminal for outputting the digital picture signal thereon, or equipped with a composite terminal or a component terminal, for outputting an analog signal thereon. Or, it may be equipped with a LAN connector for connecting with the network, or may be equipped with a USB cable. Further, it may be a transmitter portion or unit for transmitting data in a wireless manner. In relation to the audio output unit 3606, it is also similar to the video/picture output unit 3605.

Further, the input unit 3501 may comprises an image pickup optical system and a light-receiving element therein. In this instance, the recording/reproducing apparatus 3600 can be applied into, such as, a digital camera, a video camera, an observation camera (or an observation camera system), etc., for example. In this case, the input unit 3501 takes a picture of a target of photographing on the light-receiving element through the image pickup optical system, and the video data or the picture data may be produced upon basis of the signal outputted from the light-receiving element, to be outputted to the recording/reproducing unit 3502.

When the recording/reproducing apparatus 3600 is applied into the digital camera, it is possible to obtain one (1) piece of high-quality picture with high-resolution, by recording a plural number of videos, differing in time sequence, by one (1) time of photographing, and thereafter conducting the video signal processing of the video signal processor unit 3504, upon the plural number of video data. However, the video signal processing of the video signal processor unit 3504 may be conducted upon the video to be recorded into the contents accumulator unit 3503, when outputting the data from the digital camera. Or, the video signal processing of the video signal processor unit 3504 may be conducted before recording the data into the contents accumulator unit 3503, by unifying recording/reproducing unit 3502 and the video signal processor unit 3504 as a unit, or so on. In this instance, it is enough to store only an enlarged or expanded video to be treated by the user, finally, in the contents accumulator unit 3503, and therefore a management comes to be easy when the user treats the video data later.

Also, when the recording/reproducing apparatus 3600 is applied into the digital camera, for example, the picture being photographed on the light-receiving element through the image pickup optical system of the input unit 3501, it may be outputted to the recording/reproducing unit 3502, in the form of the picture data. The recording/reproducing unit 3502 may record the video data into the contents accumulator unit 3503, and the video signal processor unit 3504 may produce the picture data of high resolution, from the video data recorded. With doing this, it is possible to obtain the high-quality picture data, which has the resolution exceeding the resolution power of the light-receiving element of the video camera. And in this instance, the video signal processor unit 3504 may produce a one (1) piece of still picture data, with using the data of the plural number of frames contained within the picture data recorded. With doing so, it is possible to obtain a one (1) piece of video data of high-quality from the picture data. Or, in the similar manner to the case of the digital camera mentioned above, the video processing of the video signal processor unit 3504 may be conducted before recording the picture data into the contents accumulator unit 3503, or after recording thereof.

With such the video camera as was mentioned above, it is possible to obtain the high-quality picture data, having the resolution exceeding the resolution power of the light-receiving element of the video camera, and/or the high-quality still video data, with using the picture data photographed.

And, also when the recording/reproducing apparatus 3600 is applied into the observation camera (or the observation camera system), for example, in the similar manner to the case of the video camera mentioned above, it is possible to obtain the high-quality picture data, having the resolution exceeding the resolution power of the light-receiving element of the observation camera, and/or the high-quality still video data, with using the picture data photographed. In this instance, for example, even in case where the input unit 3501, which has the image pickup optical system and the light-receiving element therein, is separated from the recording/reproducing unit 3502 in the distance therebetween, and they are connected with each other through a network cable or the like, the picture data can be transmitted in the form of low resolution until the recording/reproducing unit 3502, and thereafter, the high-resolution can be obtained through the video signal processing within the video signal processor unit 3504. With this, it is possible to obtain the picture data of high-resolution, while using a band area of the transmission network for transmitting data from the input unit 3501 having the image pickup optical system and the light-receiving element therein.

With the video display apparatus according to the twelfth embodiment and the recording/reproducing apparatus according to the thirteenth embodiment, it is possible to obtain another embodiment of the present invention, by unifying or combining the operations and the structures of both of them. In this case, it is possible to display the picture signal or the video signal, upon which the video signal processing mentioned above was conducted, or to output it to other apparatus(es) or device(s); i.e., it can be used as any one of the display apparatus, the recording/reproducing apparatus, or the output apparatus, so that it is superior in the usability thereof.

Next, explanation will be given about differences in the operations between the embodiment of the present invention and the conventional technology mentioned above, by referring to FIGS. 34(a) and 34(b). FIG. 34(a) shows the frame #1 (3401), the frame #2 (3402), the frame #3 (3403), the frame #4 (3404) and the frame #5 (3401), which are inputted into the resolution converter unit (4), while FIG. 34(b) shows the respective frames outputted from the resolution converter unit (4). In each of the frames, the target to be photographed is moved, intestinally, so that it moves into the clockwise direction by each ¼ pixel and makes a round by four (4) frames. This motion is continued in the similar manner after the frame #6 and thereafter.

With the conventional technologies described in the Patent Document 1, the Patent Document 2 and the Non-Patent Document 1, as was mentioned above, in case when conducting the high resolution upon the 2-dimensional input signal, i.e., horizontal/vertical, since the aliasing comes from two (2) directions (horizontal/vertical), the band area of the original signal is widen 2-times in the horizontal/vertical directions, and then three (3) aliasing components overlap one another. For the purpose of negating those, there is a necessity of 2M+1=7 pieces of digital data (=7 pieces of signals of the frame video). Accordingly, in case when inputting the signals, making one round by four (4) frames as is shown in FIG. 33(a), since it is impossible to obtain independent data even if selecting any seven (7) frames, the solution obtained by the high resolution process comes to be indefinite; i.e., no solution can be obtained.

On the other hand, with using the present embodiment therein, it is possible to achieve the high resolution, with removing the aliasing component in the horizontal direction (or in the vertical direction), as is shown in FIG. 33(b), for example, with using the neighboring two (2) frames (for example, the frame #1 (3401) and the frame #2 (3402) (or the frame #2 (3402) and the frame #3 (3403)). Thus, with using the input video shown in FIG. 33(a) as a test pattern, it is possible to confirm the operation of the present embodiment. With using a CZP (circular Zone Plate), which is well know, in general, as a design of this test pattern, an effect of the resolution conversion can be seen, directly, on the display unit (3). Thus, the video can be displayed, which is improved on the resolution in the horizontal direction, if moving the CZP (circular Zone Plate), by each frame, in the horizontal direction, and/or the video can be displayed, which is improved on the resolution in the vertical direction (or in the oblique direction) if moving the CZP (circular Zone Plate) in the vertical direction (or in the oblique direction), etc., i.e., it is possible to confirm an effect of improving the resolution responding to the direction of movement of the test pattern.

However, in accordance with the conventional technologies described in the Patent Document 1, the Patent Document 2 and the Non-Patent Document 1, it is also possible to provide an output, as a result of the two-dimensional resolution conversion, by conducting a one-dimensional high resolution in the plural number of directions (horizontal/vertical/oblique (lower right)/oblique (upper right)), and thereby inputting the result of each of those into the mixer (2009) or the mixer (2707) according to the embossment of the present invention. In this case, the signal processing circuit, such as, the frame memory and the motion estimation unit, etc., comes to be large in the scale thereof, comparing to the structures for conducting the two-dimensional resolution conversion with using only two (2) frames, as is shown in FIG. 20, FIG. 21, FIG. 27 or FIG. 33; however, it is possible to make the scale of the signal processing circuit, such as, the frame memory and the motion estimation unit, etc., smaller than that of using at least seven (7) frames therein, as is described in the Patent Document 1, the Patent Document 2 or the Non-Patent Document 1.

Also, in the eighth to the eleventh embodiments mentioned above, though the explanation was given by referring the high resolution of two (2) times in the one-dimensional direction, as one example thereof, but it is also possible to apply the high resolution processing of n-times, as was explained by referring to FIGS. 18 and 19, into the eighth to the eleventh embodiments, in particular, for each of the high resolution processes of horizontal/vertical/oblique (lower right)/oblique (upper right) directions.

Also, in the embodiments mentioned above, the explanation was given on the example, by referring the case of converting the resolution of the frame #1 with using a pair of the input signals, i.e., the frame #1 and the frame #2; however, other than this, it is also possible to obtain the final result of the resolution conversion of the frame #1, by converting the resolution of the frame #1, respectively, with using plural pairs, such as, the frame #1 and the frame #3, and the frame #1 and the frame #4, etc., and thereby combining or mixing the results of those. As the mixing method in this instance, it is possible to obtain an averaged value of the respective results, or to mix them corresponding to the value of the coefficient C4 (frame) for each frame, as was shown in FIG. 23 or FIG. 24. In this case, as the coefficient C4 (frame) may be used a MAX value (the value of not smaller one) of the coefficient C4 (horizontal) and the coefficient C4 (vertical) for each frame. Or, it is also possible to obtain the final result of the resolution conversation of the frame #1, by comparing the coefficients C4 (horizontal) and C4 (vertical) of all sets, for each pixel, and then by selecting the results of the resolution conversion obtained from the set, being smallest in the coefficient C4 (i.e., the set being largest on the effect of improving the resolution), for each pixel.

Further, the frame #1, the frame #2, and frame #3, etc., may be discontinuous in the time sequence thereof, or reversed in the order in the time sequence thereof.

It is needless to say that each of the embodiments of the present invention may be also applied into, for example, a DVD player or a HDD player, other than the apparatuses explained in the above-mentioned embodiments, and further it may be applied into a portable video display terminal (for example, a portable or mobile telephone) for receiving so-called a one-segment broadcast. Also, as the video frame, it is possible to use a video frame of a signal other than the television broadcast signal. In the similar manner, the present invention may be applied onto, such as, a streaming video transmitted through the Internet, or the video reproduced from the DVD player or the HDD player, for example.

The one embodiment of the present invention is also useful in the following cases.

Thus, the one embodiment of the present invention relates to the technology for producing one (1) piece of the high-resolution video, by inputting a plural number of low-resolution videos to be fitted in the position thereof, and with this, it is possible to obtain the high-definition video exceeding a limit of the resolution of the input video.

With the conventional technology, there is necessity of a large amount of input frames (approximately, from 10 to 50 frames) and a large number of respective operations (approximately, from 10 to 100 times), when producing one (1) piece of output video. For this reason, it is necessary to provide a large number of memories and a processor for conducting super-high speed calculation; therefore, it is impossible to adapt the conventional technology into the television picture of real-time.

Then, an important problem to be dissolved was to achieve super resolution processing with a number of input frames/calculations, as small as possible, for applying into the television receiver, but with using one embodiment of the present invention, it is possible to reduce the number of input frames down to two (2) pieces at the lowest, as well as, to negate the repetitive calculations.

With using the embodiment of the present invention, but differing from the conventional SD→HD conversion technology (i.e., up-convert technology) of simply expanding the video, so as to increase the number of pixels, it is possible to convert the moving picture of SD (Standard Definition) into that of HD (High Definition), exceeding the limit of resolution of the input video. With this, it is possible to reproduce the existing DVD media, the program of SD picture quality, or the picture, which was already recorded with SD picture quality, etc., with the picture quality near to the high vision, for example, for meeting the demands of display of the high-definition on the television advancing in HD accompanying with the spread of the digital broadcast and the large-screen television of thin type.

Also, with using one embodiment of the present invention, it is possible to obtain the picture of high-definition with an aid of the number of input frames, being smaller than that of the conventional technology; therefore, it can be preferably applied into the signal processing method on the assumption of real-time processing on the television receiver.

Also, with using one embodiment of the present invention, it is possible to produce the video of HD picture quality with high definition, 1,280×720 pixels, being 2-times in the vertical direction and 2-times in the horizontal direction of the resolution thereof, for example, by inputting the video of the SD picture quality, 640×360, i.e., from two (2) pieces of input video. Thus, it is possible to obtain the conversion of the television picture of SD (Standard Definition) into the picture of quality near to that of the high vision.

Also, in each of the embodiments mentioned above, the explanation was made with listing up the high resolution by a unit of frame, for example. However, the target of the high resolution should not be always the frame as a whole. For example, the target of resolution may be made in a part of frame of the input video or the input picture. Thus, it is possible to obtain a high-quality enlarged video of a part of the input video or the input picture, by implementing the video processing, according to one embodiment of the present invention mentioned above, targeting upon a plural number of frames in a part of the frames of the input picture. This may be applied into enlarged display of a part of the picture, for example.

Further, if combining any one of the embodiments mentioned above, it is also possible to obtain another embodiment of the present invention.

With each of the embodiments of the present invention mentioned above, it is possible to conduct the process, preferably, for converting the video of low resolution into the enlarged video, thereby obtaining the high-resolution video of high picture quality. Thus, it is possible to obtain the high resolution of the video signal, preferably.

Also, with each of the embodiments of the present invention mentioned above, it is possible to reduce the frame number of the video necessary for obtaining the high-resolution picture of high picture quality.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A video signal processing apparatus, comprising:
an input unit configured to input video frames;
resolution converter units, each of which is configured to have a resolution converting characteristic for increasing pixels in one of the video frames to produce a converted frame; and
a mixer unit configured to mix converted frames from the resolution converter units to obtain an output video frame, wherein:
one of the resolution converter units is configured to perform a first resolution conversion on one of the input video frames to increase the pixels in a first direction for the one of the input video frames, and
another of the resolution converter units is configured to perform a second resolution conversion on another of the input video frames to increase the pixels in a second direction which is different from the first direction for the another of the input video frames;
wherein each of the resolution converter units increases the pixels of the video frames by $\pi/2$ in the first and second directions, shifts phases of the video frames, and adds the video frames after the shift and the video frames before the shift to produce converted video frames.

2. The video signal processing apparatus, as described in claim 1, wherein said mixer unit obtains an averaged value of the converted frames from the resolution converter units for obtaining the output video frame.

3. The video signal processing apparatus, as described in claim 1, wherein said mixer unit obtains the output video frame by mixing the converted frames from the resolution converter units in accordance with a mixing ratio determined based on a moving amount of a target in said input video frames.

4. The video signal processing apparatus, as described in claim 1, wherein said mixer unit obtains the output video frame by composing respective results of conducting a predetermined two-dimensional frequency separation on the converted frames from the resolution converter units.

5. The video signal processing apparatus, as described in claim 1, wherein the resolution converter units include a horizontal resolution converter unit, and a vertical resolution converter unit.

6. The video signal processing apparatus, as described in claim 1, wherein the resolution converter units include a horizontal resolution converter unit, a vertical resolution converter unit, a resolution converter unit in an oblique (lower right) direction, and a resolution converter unit in an oblique (upper right) direction.

7. A video signal processing method, comprising the steps of inputting video frames;
increasing pixels in the video frames using resolution converter units, to produce converted frames; and
mixing the converted frames from the resolution converter units to obtain an output video frame,
wherein the increasing step includes:
performing a first resolution conversion on one of the input video frames to increase the pixels in a first direction, and performing a second resolution conversion on another of the input video frames to increase the pixels in a second direction which is different from the first direction, the first and second resolution conversions being performed concurrently with each other;

wherein the increasing step increases the pixels of the video frames by π/2 in the first and second directions, shifts phases of the video frames, and adds the video frames after the shift and the video frames before the shift to produce the converted video frames.

8. The video signal processing method, as described in claim 7, wherein said mixing step obtains an averaged value of the converted frames from the resolution converter units for obtaining the output video frame.

9. The video signal processing method, as described in claim 7, wherein said mixing step obtains the output video frame by mixing the converted frames from the resolution converter units in accordance with a mixing ratio determined based on a moving amount of the target in said input video frames.

10. The video signal processing method, as described in claim 7, wherein said mixing step obtains the output video frame by composing respective results of conducting a predetermined two-dimensional frequency separation on the converted frames from the resolution converter units.

11. A video display apparatus, comprising:
an input unit configured to input video data therein;
a video signal processor unit configured to:
increase the respective numbers of pixels of a first video frame and a second video frame contained in said video data by π/2 in directions different from each other,
shift phases of the first video frame and the second video frame,
add the first and the second frames after the shift and the first and the second frames before the shift for removing aliasing components contained in the first and second video frames, and
mix the first and second video frames from which said aliasing components are removed for producing an output video frame; and
a display unit configured to display a video based upon an output from said video signal processor unit, wherein
the video signal processor unit performs a first resolution conversion on the first video frame to increase the number of pixels in a first direction and a second resolution conversion on the second video frame to increase the number of pixels in a second direction which is different from the first direction, and the first and second resolution conversions being is performed concurrently with each other.

12. The video display apparatus, as described in claim 11, wherein said video data is moving picture data, and said first and said second frames are the video frames of a moving video.

13. The video display apparatus, as described in claim 11, wherein said video data is a television broadcast signal.

* * * * *